(12) United States Patent
Link

(10) Patent No.: US 10,448,189 B2
(45) Date of Patent: Oct. 15, 2019

(54) VIRTUAL REALITY, AUGMENTED REALITY, AND MIXED REALITY SYSTEMS WITH SPATIALIZED AUDIO

(71) Applicant: MAGIC LEAP, INC., Plantation, FL (US)

(72) Inventor: Gregory Michael Link, Miramar, FL (US)

(73) Assignee: MAGIC LEAP, INC., Plantation, FL (US)

( * ) Notice: Subject to any disclaimer, the term of this patent is extended or adjusted under 35 U.S.C. 154(b) by 86 days.

(21) Appl. No.: 15/703,946

(22) Filed: Sep. 13, 2017

(65) Prior Publication Data

US 2018/0077513 A1 Mar. 15, 2018

Related U.S. Application Data

(60) Provisional application No. 62/394,617, filed on Sep. 14, 2016.

(51) Int. Cl.
*H04R 5/02* (2006.01)
*H04S 7/00* (2006.01)
*G02B 27/00* (2006.01)
*G02B 27/01* (2006.01)

(52) U.S. Cl.
CPC .......... *H04S 7/303* (2013.01); *G02B 27/0093* (2013.01); *G02B 27/017* (2013.01); *G02B 2027/0178* (2013.01); *G02B 2027/0187* (2013.01); *H04S 2400/11* (2013.01); *H04S 2400/15* (2013.01)

(58) Field of Classification Search
CPC .............. G02B 27/0093; G02B 27/017; G02B 2027/178; G02B 2027/0187; H04S 1/005; H04S 7/302; H04S 7/303; H04S 2400/11; H04S 2400/15
USPC ................................ 381/309, 310, 17–19, 1
See application file for complete search history.

(56) References Cited

U.S. PATENT DOCUMENTS

| | | | |
|---|---|---|---|
| 9,037,468 B2 * | 5/2015 | Osman | H04S 7/304 704/270 |
| 9,271,103 B2 * | 2/2016 | Wells | H04S 7/304 |
| 2001/0040969 A1 | 11/2001 | Revit et al. | |
| 2004/0013277 A1 | 1/2004 | Crocitti et al. | |
| 2006/0142998 A1 | 6/2006 | Tseng et al. | |

(Continued)

OTHER PUBLICATIONS

Jot, J., et al., "A Comparative Study of 3-D Audio Encoding and Rendering Techniques," AES 16$^{th}$ International Conference, Apr. 1999 (20 pages).

(Continued)

*Primary Examiner* — Xu Mei
(74) *Attorney, Agent, or Firm* — Vista IP Law Group LLP

(57) ABSTRACT

A spatialized audio system includes a sensor to detect a head pose of a listener. The system also includes a processor to render audio data in first and second stages. The first stage includes rendering first audio data corresponding to a first plurality of sources to second audio data corresponding to a second plurality of sources. The second stage includes rendering the second audio data corresponding to the second plurality of sources to third audio data corresponding to a third plurality of sources based on the detected head pose of the listener. The second plurality of sources consists of fewer sources than the first plurality of sources.

20 Claims, 17 Drawing Sheets

(56) References Cited

U.S. PATENT DOCUMENTS

| | | |
|---|---|---|
| 2009/0310802 A1 | 12/2009 | Zhang et al. |
| 2012/0093320 A1 | 4/2012 | Flaks et al. |
| 2013/0170678 A1 | 7/2013 | Beddingfield, Sr. et al. |
| 2014/0241529 A1 | 8/2014 | Lee |
| 2014/0376741 A1 | 12/2014 | Kechichian et al. |
| 2015/0156578 A1 | 6/2015 | Alexandridis et al. |
| 2015/0205126 A1 | 7/2015 | Schowengerdt |
| 2015/0208166 A1 | 7/2015 | Raghuvanshi et al. |
| 2015/0208184 A1 | 7/2015 | Tan et al. |
| 2016/0026253 A1 | 1/2016 | Bradski et al. |

OTHER PUBLICATIONS

Jot, J., et al., "Approaches to binaural synthesis," AES $105^{th}$ Convention, Sep. 1998 (14 pages).

PCT International Search Report and Written Opinion for International Appln. No. PCT/US2017/051421, Applicant Magic Leap, Inc., forms PCT/ISA/210, 220, and 237, dated Nov. 17, 2017 (26 pages).

* cited by examiner

VIRTUAL REALITY, AUGMENTED REALITY, AND MIXED REALITY SYSTEMS WITH SPATIALIZED AUDIO

CROSS-REFERENCE TO RELATED APPLICATIONS

The present application claims priority to U.S. Provisional Application Ser. No. 62/394,617, filed on Sep. 14, 2016 and entitled "MIXED REALITY SYSTEM WITH SPATIALIZED AUDIO." The present application is related to U.S. Provisional Patent Application Ser. Nos. 62/291,363, filed on Feb. 4, 2014 and 62/369,561, filed on Aug. 1, 2016, and U.S. Utility patent application Ser. No. 14/738,877 filed on Jun. 13, 2013 and Ser. No. 14/555,585 filed on Nov. 27, 2014. The contents of these patent applications are hereby expressly and fully incorporated by reference in their entirety, as though set forth in full. Described in the aforementioned incorporated patent applications are various embodiments of virtual reality, augmented reality, and/or mixed reality systems including spatialized audio systems. Described herein are further embodiments of virtual reality, augmented reality, and/or mixed reality systems with spatialized audio systems and methods.

FIELD OF THE INVENTION

The present disclosure relates to virtual reality, augmented reality, and/or mixed reality systems with spatialized audio systems, and methods for generating a virtual reality, augmented reality, and/or mixed reality experience including spatialized audio using same.

BACKGROUND

Modern computing and display technologies have facilitated the development of mixed reality systems for so called "mixed reality" ("MR"), "virtual reality" ("VR") and/or "augmented reality" ("AR") experiences. This can be done by presenting computer-generated imagery to the user through a head-mounted display. This imagery creates a sensory experience which immerses the user in the simulated environment. A VR scenario typically involves presentation of digital or virtual image information without transparency to actual real-world visual input.

AR systems generally supplement a real-world environment with simulated elements. For example, AR systems may provide a user with a view of the surrounding real-world environment via a head-mounted display. However, computer-generated imagery can also be presented on the display to enhance the real-world environment. This computer-generated imagery can include elements which are contextually-related to the real-world environment. Such elements can include simulated text, images, objects, etc. MR systems also introduce simulated objects into a real-world environment, but these objects typically feature a greater degree of interactivity than in AR systems. The simulated elements can often times be interactive in real time. VR/AR/MR scenarios can be presented with spatialized audio to improve user experience.

Various optical systems generate images at various depths for displaying VR/AR/MR scenarios. Some such optical systems are described in U.S. Utility patent application Ser. No. 14/738,877 and U.S. Utility patent application Ser. No. 14/555,585 filed on Nov. 27, 2014, the contents of which have been previously incorporated-by-reference herein.

Current spatialized audio systems can cooperate with 3-D optical systems, such as those in 3-D cinema, 3-D video games, virtual reality, augmented reality, and/or mixed reality systems, to render, both optically and sonically, virtual objects. Objects are "virtual" in that they are not real physical objects located in respective positions in three-dimensional space. Instead, virtual objects only exist in the brains (e.g., the optical and/or auditory centers) of viewers and/or listeners when stimulated by light beams and/or soundwaves respectively directed to the eyes and/or ears of audience members. Unfortunately, the listener position and orientation requirements of current spatialized audio systems limit their ability to create the audio portions of virtual objects in a realistic manner for out-of-position listeners.

Current spatialized audio systems, such as those for home theaters and video games, utilize the "5.1" and "7.1" formats. A 5.1 spatialized audio system includes left and right front channels, left and right rear channels, a center channel and a subwoofer. A 7.1 spatialized audio system includes the channels of the 5.1 audio system and left and right channels aligned with the intended listener. Each of the above-mentioned channels corresponds to a separate speaker. Cinema audio systems and cinema grade home theater systems include DOLBY ATMOS, which adds channels configured to be delivered from above the intended listener, thereby immersing the listener in the sound field and surrounding the listener with sound.

Despite improvements in spatialized audio systems, current spatialized audio systems are not capable of taking into account the location and orientation of a listener, not to mention the respective locations and orientations of a plurality of listeners. Therefore, current spatialized audio systems generate sound fields with the assumption that all listeners are positioned adjacent the center of the sound field and oriented facing the center channel of the system, and have listener position and orientation requirements for optimal performance. Accordingly, in a classic one-to-many system, spatialized audio may be delivered to a listener such that the sound appears to be backwards, if that listener happens to be facing opposite of the expected orientation. Such misaligned sound can lead to sensory and cognitive dissonance, and degrade the spatialized audio experience, and any VR/AR/MR experience presented therewith. In serious cases, sensory and cognitive dissonance can cause physiological side-effects, such as headaches, nausea, discomfort, etc., that may lead users to avoid spatialized audio experiences or VR/AR/MR experiences presented therewith.

In a similar technology space, mixed media systems such as those found in theme park rides (i.e., DISNEY'S STAR TOURS) can add real life special effects such as lights and motion to 3-D film and spatialized audio. Users of 3-D mixed media systems are typically required to wear glasses that facilitate system generation of 3-D imagery. Such glasses may contain left and right lenses with different polarizations or color filters, as in traditional anaglyph stereoscopic 3-D systems. The 3-D mixed media system projects overlapping images with different polarizations or colors such that users wearing stereoscopic glasses will see slightly different images in their left and right eyes. The differences in these images are exploited to generate 3-D optical images. However, such systems are prohibitively expensive. Moreover, such mixed media systems do not address the inherent user position and orientation requirements of current spatialized audio systems.

To address these issues, some VR/AR/MR systems include head mounted speakers operatively coupled to a spatialized audio system, so that spatialized audio can be rendered using a "known" position and orientation relationship between speakers and a user/listener's ears. Various examples of such VR/AR/MR systems are described in U.S. Provisional Patent Application Ser. No. 62/369,561, the contents of which have been previously incorporated-by-reference herein. While these VR/AR/MR systems address the listener position issue described above, the systems still have limitations related to processing time, lag and latency that can result in cognitive dissonance with rapid user head movements.

For instance, some VR/AR/MR system deliver spatialized audio to a user/listener through head mounted speakers. Accordingly, if a virtual sound source (e.g., a bird) is virtually located to the right of a user/listener in a first pose (which may be detected by the VR/AR/MR system), the VR/AR/MR system may deliver generated sound (e.g., chirping) corresponding to the virtual sound source that appears to originate from the right of the user/listener. The VR/AR/MR system may deliver the sound mostly through one or more speakers mounted adjacent the user/listener's right ear. If the user/listener turns her head to face the virtual sound source, the VR/AR/MR system may detect this second pose and deliver generated sound corresponding to the virtual sound source that appears to originate from in front of the user/listener.

However, if the user/listener rapidly turns her head to face the virtual sound source, the VR/AR/MR system will experience a lag or latency related to various limitations of the system and the method of generating virtual sound based on a pose of a user/listener. An exemplary virtual sound generation method includes, inter alia, (1) detecting a pose change, (2) communicating the detected pose change to the processor, (3) generating new audio data based on the changed pose, (4) communicating the new audio data to the speakers, and (5) generating virtual sound based on the new audio data. These steps between detecting a pose change and generating virtual sound can result in lag or latency that can lead to cognitive dissonance in a VR/AR/MR experience with associated spatialized audio when the user/listener rapidly changes her pose.

Spatialized audio associated with a VR/AR/MR experience illustrates the cognitive dissonance because a virtual sound (e.g., a chirp) may appear to emanate from a location different from the image of the virtual object (e.g., a bird). However, all spatialized audio systems (with or without a VR/AR/MR system) can result in cognitive dissonance with rapid pose change because all spatialized audio systems include virtual sound sources with virtual locations and orientations relative to the user/listener. For instance, if a virtual bird is located to the right of the listener, the chirp should appear to emanate from the same point in space regardless of the orientation of the user's head, or how quickly that orientation changes.

SUMMARY

In one embodiment, a spatialized audio system includes a sensor to detect a head pose of a listener. The system also includes a processor to render audio data in first and second stages. The first stage includes rendering first audio data corresponding to a first plurality of sources to second audio data corresponding to a second plurality of sources. The second stage includes rendering the second audio data corresponding to the second plurality of sources to third audio data corresponding to a third plurality of sources based on the detected head pose of the listener. The second plurality of sources consists of fewer sources than the first plurality of sources.

In another embodiment, a spatialized audio system includes a sensor to detect a first head pose at a first time and a second head pose of a listener at a second time, the second time being after the first time. The system also includes a processor to render audio data in first and second stages. The first stage includes rendering first audio data corresponding to a first plurality of sources to second audio data corresponding to a second plurality of sources based on the detected first head pose of the listener. The second stage includes rendering the second audio data corresponding to the second plurality of sources to third audio data corresponding to a third plurality of sources based on the detected second head pose of the listener. The second plurality of sources consists of fewer sources than the first plurality of sources.

In still another embodiment, a method of rendering spatialized audio includes rendering first audio data corresponding to a first plurality of sources to second audio data corresponding to a second plurality of sources. The method also includes detecting a head pose of a listener. The method further includes rendering the second audio data corresponding to the second plurality of sources to third audio data corresponding to a third plurality of sources based on the detected head pose of the listener. The second plurality of sources consists of fewer sources than the first plurality of sources.

In yet another embodiment, a method of rendering spatialized audio includes detecting a first head pose of a listener. The method also includes rendering first audio data corresponding to a first plurality of sources to second audio data corresponding to a second plurality of sources based on the detected first head pose of the listener. The method further includes detecting a second head pose of the listener. Moreover, the method includes rendering the second audio data corresponding to the second plurality of sources to third audio data corresponding to a third plurality of sources based on the detected second head pose of the listener. The second plurality of sources consists of fewer sources than the first plurality of sources.

In still another embodiment, a computer program product is embodied in a non-transitory computer readable medium, the computer readable medium having stored thereon a sequence of instructions which, when executed by a processor causes the processor to execute a method for rendering spatialized audio. The method includes rendering first audio data corresponding to a first plurality of sources to second audio data corresponding to a second plurality of sources. The method also includes detecting a head pose of a listener. The method further includes rendering the second audio data corresponding to the second plurality of sources to third audio data corresponding to a third plurality of sources based on the detected head pose of the listener. The second plurality of sources consists of fewer sources than the first plurality of sources.

In yet another embodiment, a computer program product is embodied in a non-transitory computer readable medium, the computer readable medium having stored thereon a sequence of instructions which, when executed by a processor causes the processor to execute a method for rendering spatialized audio. The method includes detecting a first head pose of a listener. The method also includes rendering first audio data corresponding to a first plurality of sources to second audio data corresponding to a second plurality of sources based on the detected first head pose of the listener.

The method further includes detecting a second head pose of the listener. Moreover, the method includes rendering the second audio data corresponding to the second plurality of sources to third audio data corresponding to a third plurality of sources based on the detected second head pose of the listener. The second plurality of sources consists of fewer sources than the first plurality of sources.

In one or more embodiments, the sensor is an inertial measurement unit. The first and/or second pluralities of sources may be virtual sound sources. The sensor may detect the head pose of the listener after the first stage and before the second stage. The sensor may detect the head pose of the listener immediately before the second stage.

In one or more embodiments, the third plurality of sources consists of fewer sources than the second plurality of sources or an equal number of sources as the second plurality of sources. The first audio data may be a full audio stream data set. The second plurality of sources may consist of 8 or fewer sources.

In one or more embodiments, each of the first, second, and/or third pluralities of sources corresponds to a different position/orientation. The first plurality of sources may correspond to a first plurality of positions. The second plurality of sources may correspond to a second plurality of positions, and each of the second plurality of positions may be closer to the listener than each of the first plurality of positions. The second plurality of positions may not be located in a single plane.

In one or more embodiments, the system also includes a plurality of speakers corresponding to the third plurality of sources to produce sound based on the third audio data. Each of the third plurality of sources may correspond to a different position, and each of the plurality of speakers may correspond to a respective source of the third plurality of sources at a respective different position.

In one or more embodiments, the second stage may include rendering the second audio data corresponding to the second plurality of sources to the third audio data corresponding to the third plurality of sources based on the detected head pose of the listener and respective positions/ orientations of the second plurality of sources. The second stage may be more sensitive to rotation than translation of the listener. The second stage may be a rotation-only audio transformation. Each of the second plurality of sources may be located from about 6 inches to about 12 inches from the listener's head.

In one or more embodiments, the sensor detects the first head pose of the listener before the first stage. The sensor may detect the second head pose of the listener after the first stage and before the second stage. The sensor may detect the second head pose of the listener immediately before the second stage.

In one or more embodiments, the second stage includes rendering the second audio data corresponding to the second plurality of sources to the third audio data corresponding to the third plurality of sources based on the detected second head pose of the listener and respective positions/orientations of the second plurality of sources.

In one or more embodiments, the method also includes detecting the head pose of the listener after rendering the first audio data and before rendering the second audio data. The method may also include detecting the head pose of the listener immediately before rendering the second audio data. The method may also include producing sound based on the third audio data through a plurality of speakers corresponding to the third plurality of sources. The method may also include rendering the second audio data corresponding to the second plurality of sources to the third audio data corresponding to the third plurality of sources based on the detected head pose of the listener and respective positions/ orientations of the second plurality of sources.

In one or more embodiments, rendering the second audio data corresponding to the second plurality of sources to the third audio data corresponding to the third plurality of sources is more sensitive to rotation than translation of the listener. Rendering the second audio data corresponding to the second plurality of sources to the third audio data corresponding to the third plurality of sources may be a rotation-only audio transformation.

In one or more embodiments, the method also includes detecting the first head pose of the listener before rendering the first audio data. The method may also include detecting the second head pose of the listener after rendering the first audio data and before rendering the second audio data. The method may also include detecting the second head pose of the listener immediately before rendering the second audio data.

In one or more embodiments, the method also includes rendering the second audio data corresponding to the second plurality of sources to the third audio data corresponding to the third plurality of sources based on the detected second head pose of the listener and respective positions/orientations of the second plurality of sources.

BRIEF DESCRIPTION OF THE DRAWINGS

The drawings illustrate the design and utility of various embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
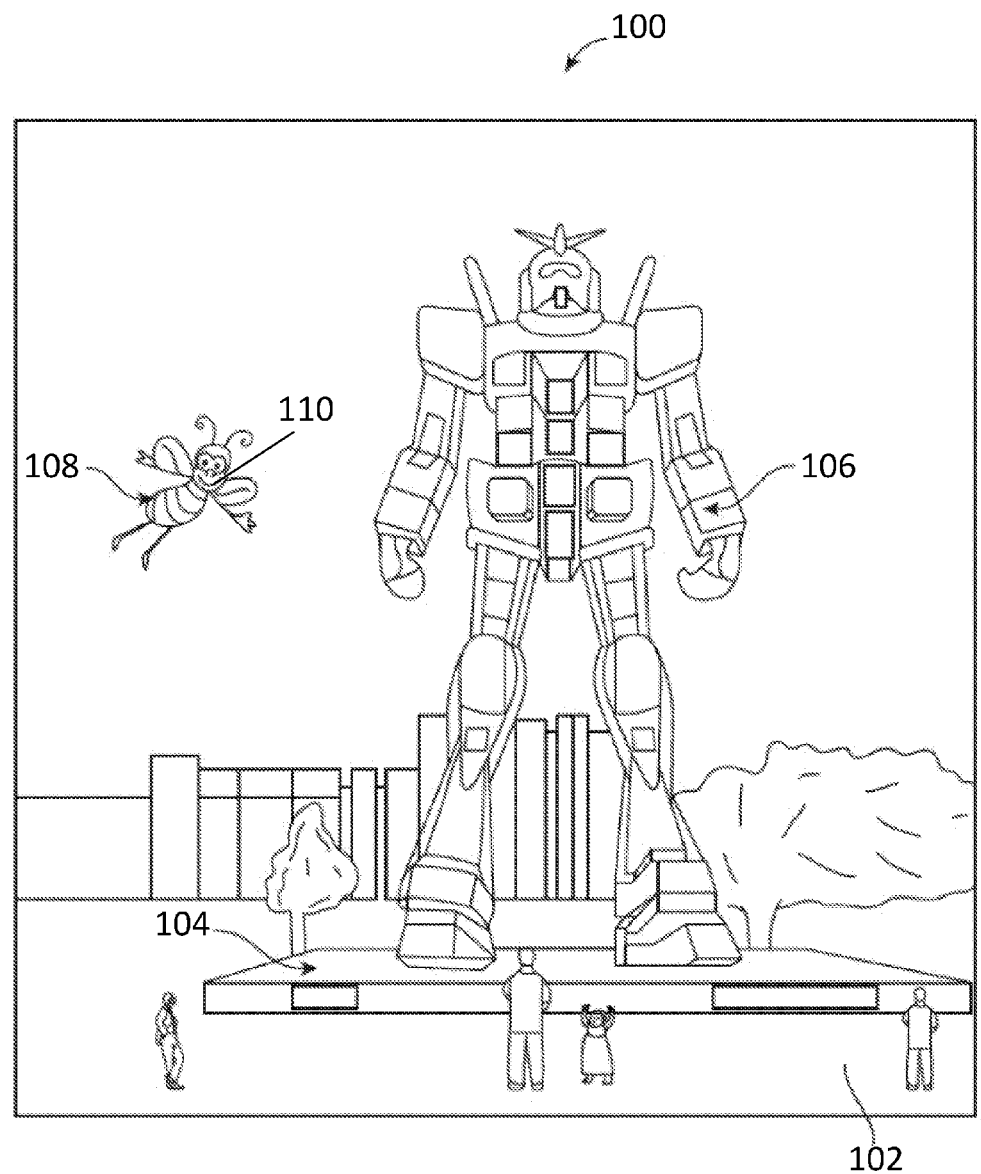
FIG. 1 depicts a user's view of augmented reality/mixed reality through a wearable AR/MR user device according to one embodiment.

Various embodiments of the invention are directed to systems, methods, and articles of manufacture for spatialized audio systems in a single embodiment or in multiple embodiments. Other objects, features, and advantages of the invention are described in the detailed description, figures, and claims.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

The spatialized audio systems may be implemented independently of AR/MR systems, but many embodiments below are described in relation to AR/MR systems for illustrative purposes only. Further, the spatialized audio systems described herein may also be used in an identical manner with VR systems.

Summary of Problems and Solutions

Spatialized audio systems, such as those for use with or forming parts of 2-D/3-D cinema systems, 2-D/3-D video games and VR/AR/MR systems, render, present and emit spatialized audio corresponding to virtual objects with virtual locations in real-world, physical, 3-D space. As used in this application, "emitting," "producing" or "presenting" audio or sound includes, but is not limited to, causing formation of sound waves that may be perceived by the human auditory system as sound (including sub-sonic low frequency sound waves). These virtual locations are typically "known" to (i.e., recorded in) the spatialized audio system using a coordinate system (e.g., a coordinate system with the spatialized audio system at the origin and a known orientation relative to the spatialized audio system). Virtual audio sources associated with virtual objects have content, position and orientation. Another characteristic of virtual audio sources is volume, which falls off as a square of the distance from the listener. However, current spatialized audio systems (e.g., 5.1 spatialized audio systems, 7.1 spatialized audio systems, cinema audio systems and even some head-worn audio systems) all have listener position and orientation restrictions that limit the number and characteristics of listeners for which the spatialized audio systems can generate realistic spatialized audio.

Head-worn spatialized audio systems according to some embodiments described herein track a pose (e.g., position and orientation) of a user/listener to more accurately render spatialized audio such that audio associated with various virtual objects appear to originate from virtual positions corresponding to the respective virtual objects. Systems according to some embodiments described herein also track a head pose of a user/listener to more accurately render spatialized audio such that directional audio associated with various virtual objects appear to propagate in virtual directions appropriate for the respective virtual objects (e.g., out of the mouth of a virtual character, and not out of the back of the virtual characters' head). Moreover, systems according to some embodiments described herein include other real physical and virtual objects in their rendering of spatialized audio such that audio associated with various virtual objects appear to appropriately reflect off of the real physical and virtual objects.

However, even head-worn spatialized audio systems including pose tracking based audio rendering are susceptible to system lag and latency between detecting a pose change and presentation of virtual sound associated therewith. This system lag and latency may lead to cognitive dissonance between a virtual position of a virtual sound source and a real position of virtual sound corresponding to the virtual sound source. System lag and latency are especially problematic with rapid pose changes (e.g., rapid head movements), which can increase the magnitude/extent of the cognitive dissonance.

Spatialized audio systems described herein perform a two stage audio data rendering process. In the first stage, the system renders first audio data corresponding to a first plurality of sources to second audio data corresponding to a second plurality of sources. The first stage may take into account a head pose estimate. The second plurality of sources has fewer sources compared to the first plurality of sources, thereby simplifying the audio data. In the second stage, the system renders the second audio data to third audio data corresponding to a third plurality of sources (e.g., system speakers). The second stage takes into account a most recently available head pose estimate of the user/listener to more accurately render the third audio data. The previous processing in the first stage reduced the processor cycles and time required to render the third audio data. Therefore, splitting audio processing into two stages and taking more current head pose into account in the second later and simpler stage, reduces the system lag and latency between estimating a head pose and presentation of virtual sound based thereon.

Spatialized Audio Systems

AR/MR scenarios often include presentation of images and sound corresponding to virtual objects in relationship to real-world objects. For example, referring to FIG. 1, an augmented reality scene 100 is depicted wherein a user of an AR/MR technology sees a real-world, physical, park-like setting 102 featuring people, trees, buildings in the background, and a real-world, physical concrete platform 104. In addition to these items, the user of the AR/MR technology also perceives that he "sees" a virtual robot statue 106 standing upon the real-world, physical platform 104, and a virtual cartoon-like avatar character 108 flying by which seems to be a personification of a bumblebee, even though these virtual objects 106, 108 do not exist in the real world.

In order to present a believable or passable AR/MR scene 100, the virtual objects (e.g., the robot statue 106 and the bumblebee 108) may have synchronized spatialized audio respectively associated therewith. For instance, mechanical sounds associated with the robot statue 106 may be generated so that they appear to emanate from the virtual location corresponding to the robot statue 106. Similarly, a buzzing sound associated with the bumblebee 108 may be generated so that they appear to emanate from the virtual location corresponding to the bumblebee 108.

The spatialized audio may have an orientation in addition to a position. For instance, a "cartoonlike" voice associated with the bumblebee 108 may appear to emanate from the mouth 110 of the bumblebee 108. While the bumblebee 108 is facing the viewer/listener in the scenario depicted in FIG. 1, the bumblebee 108 may be facing away from the viewer/listener in another scenario such as one in which the viewer/listener has moved behind the virtual bumblebee 108. In that case, the voice of the bumblebee 108 would be rendered as a reflected sound off of other objects in the scenario (e.g., the robot statue 106).

In some embodiments, virtual sound may be generated so that it appears to emanate from a real physical object. For instance, virtual bird sound may be generated so that it appears to originate from the real trees in the AR/MR scene 100. Similarly, virtual speech may be generated so that it appears to originate from the real people in the AR/MR scene 100. In an AR/MR conference, virtual speech may be generated so that it appears to emanate from a real person's mouth. The virtual speech may sound like the real person's voice or a completely different voice. In one embodiment, virtual speech may appear to emanate simultaneously from a plurality of sound sources around a listener. In another embodiment virtual speech may appear to emanate from within a listener's body.

In a similar manner, VR scenarios can also benefit from more accurate and less intrusive spatialized audio generation and delivery while minimizing psychoacoustic effects. Like AR/MR scenarios, VR scenarios must also account for one or more moving viewers/listeners units rendering of spatialized audio. Accurately rendering spatialized audio in terms of position, orientation and volume can improve the immersiveness of VR scenarios, or at least not detract from the VR scenarios.

Figure 2:
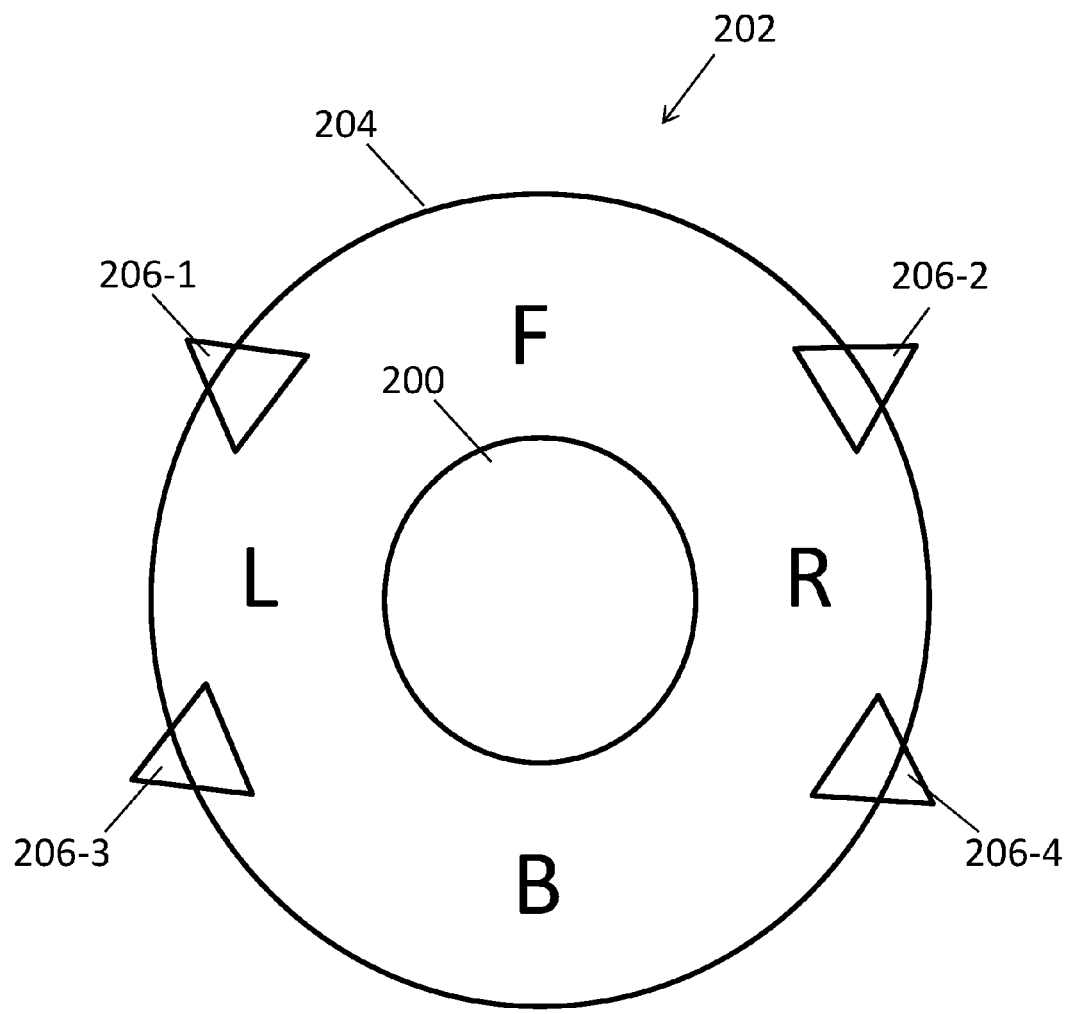
FIG. 2 is a top schematic view of a spatialized audio system according to one embodiment worn on a user/ listener's head.

FIG. 2 schematically depicts a spatialized audio system 202 worn on a listener's head 200 in a top view from above the listener's head 200. As shown in FIG. 2, the spatialized audio system 202 includes a frame 204 and four speakers 206-1, 206-2, 206-3, 206-4 attached to the frame 204. Speaker 206-1 is attached to the frame 204 such that, when the spatialized audio system 202 is worn on the listener's head 200, speaker 206-1 is forward F and to the left L of the listener's head 200. Speaker 206-2 is attached to the frame 204 such that, when the spatialized audio system 202 is worn on the listener's head 200, speaker 206-2 is forward F and to the right R of the listener's head 200. Speaker 206-3 is attached to the frame 204 such that, when the spatialized audio system 202 is worn on the listener's head 200, speaker 206-3 is behind B and to the left L of the listener's head 200. Speaker 206-4 is attached to the frame 204 such that, when the spatialized audio system 202 is worn on the listener's head 200, speaker 206-4 is behind B and to the right R of the listener's head 200. All of the speakers 206-1, 206-2, 206-3, 206-4 are pointed toward the listener's head 200. The speaker placement depicted in FIG. 2 facilitates generation of spatialized audio.

As used in this application, "speaker," includes but is not limited to, any device that generates sound, including sound outside of the typical humans hearing range. Because sound is basically movement of air molecules, many different types of speakers can be used to generate sound. One or more of the speakers 206-1, 206-2, 206-3, 206-4 depicted in FIG. 2 can be a conventional electrodynamic speaker or a vibration transducer that vibrates a surface to generate sound. In embodiments including vibration transducers, the transducers may vibrate any surfaces to generate sound, including but not limited to, the frame 204 and the skull of the listener. The speakers 206-1, 206-2, 206-3, 206-4 may be removably attached to the frame 204 (e.g., magnetically) such that the speakers 206-1, 206-2, 206-3, 206-4 may be replaced and/or upgraded.

Figure 3:
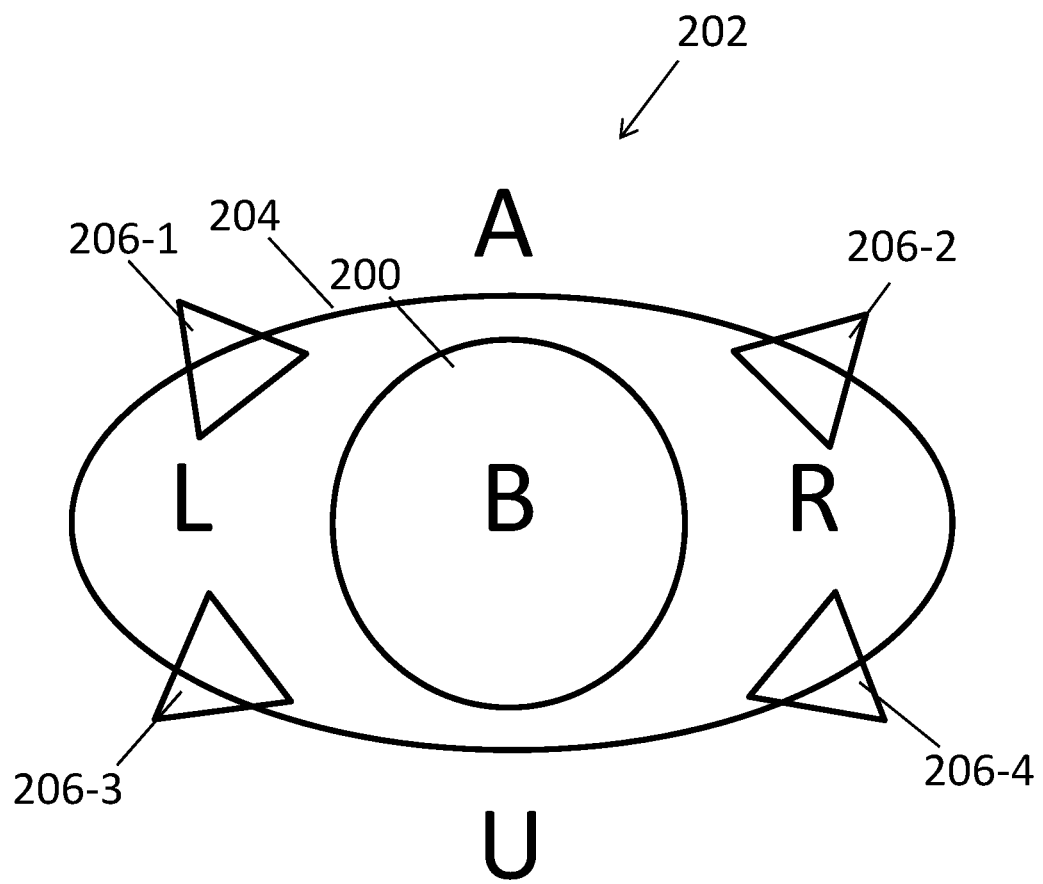
FIG. 3 is a back schematic view of the spatialized audio system worn on the user/listener's head as depicted in FIG. 2.

FIG. 3 schematically depicts the spatialized audio system 202 depicted in FIG. 2 from a back view behind the listener's head 200. As shown in FIG. 3, the frame 204 of the spatialized audio system 202 may be configured such that when the spatialized audio system 202 is worn on the listener's head 200, the front of the frame 204 is above A the listener's head 200 and the back of the frame 204 is under U listener's head 200. Because the four speakers 206-1, 206-2, 206-3, 206-4 of the spatialized audio system 202 are attached to the frame 204, the speakers are also disposed above A 206-1, 206-2 and under U 206-3, 206-4 the listener's head 200, when the spatialized audio system 202 is worn on the listener's head 200. The speaker placement depicted in FIG. 3 facilitates generation of spatialized audio, especially spatialized audio including virtual audio sources located in planes above A and under U the listener's head 200.

Figure 4:
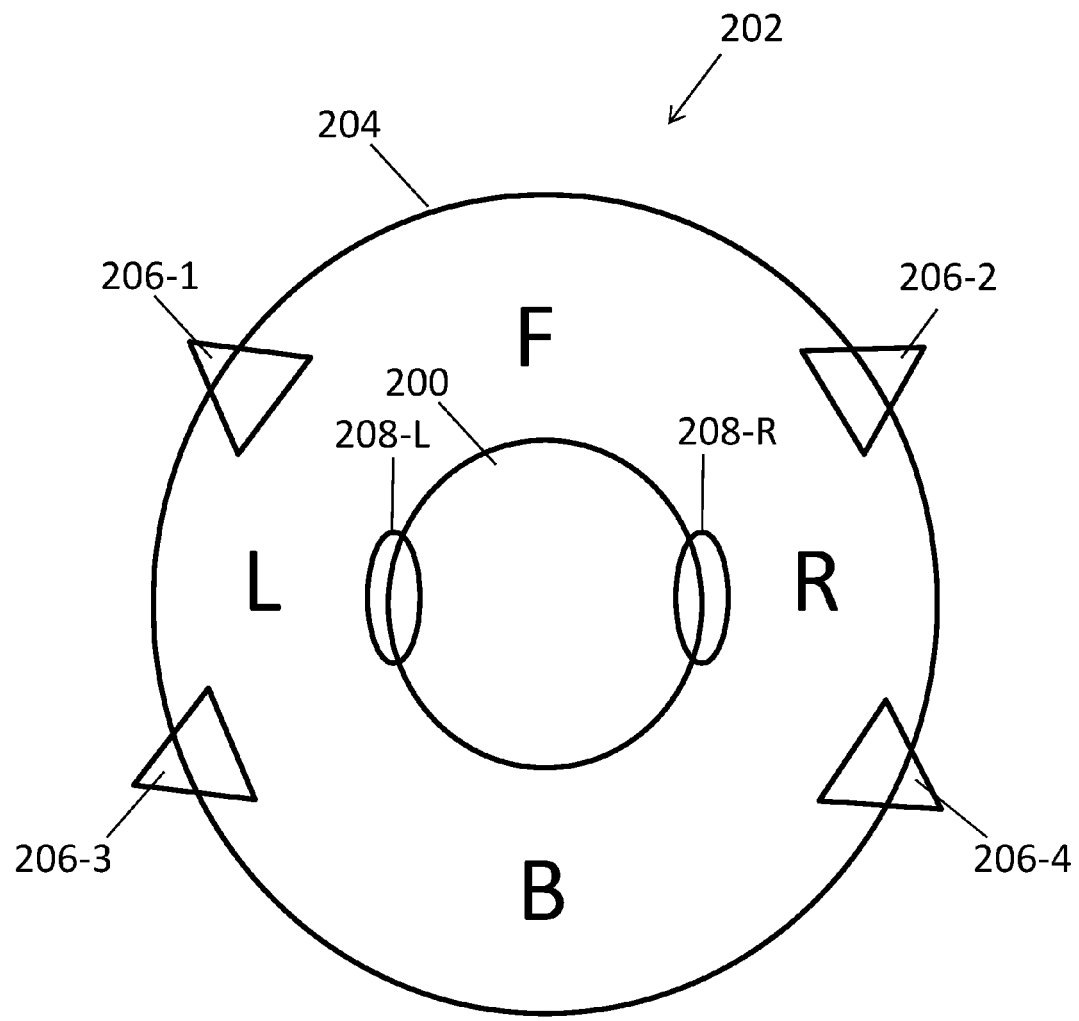
FIG. 4 is a more detailed top schematic view of the spatialized audio system worn on the user/listener's head as depicted in FIG. 2.

While it has been stated that the speakers 206-1, 206-2, 206-3, 206-4 are pointed toward the listener's head 200, it is more accurate to describe the speakers 206-1, 206-2, 206-3, 206-4 as being pointed toward the listener's ears 208-L, 208-R, as shown in FIG. 4. FIG. 4 is a top view similar to the one depicted in FIG. 2. Speakers 206-1, 206-3 are pointed toward the listener's left ear 208-L. Speakers 206-2, 206-4 are pointed toward the listener's right ear 208-R. Pointing the speakers 206-1, 206-2, 206-3, 206-4 toward the listener's ears 208-L, 208-R minimizes the volume needed to render the spatialized audio for the listener. This, in turn, reduces the amount of sound leaking from the spatialized audio system 202 (i.e., directed toward unintended listeners). Each speaker 206-1, 206-2, 206-3, 206-4 may generate a predominately conical bloom of sound waves to focus spatialized audio toward one of the listener's ears 208-L, 208-R. The frame 204 may also be configured to focus the spatialized audio toward the listener's ears 208-L, 208-R. For instance, the frame 204 may include or form an acoustic waveguide to direct the spatialized audio.

While the system 202 in FIGS. 2 to 4 includes four speakers 206-1, 206-2, 206-3, 206-4, other spatialized audio systems may include fewer or more speakers. In one embodiment, a spatialized audio system includes six speakers (and corresponding sound channels) displaced from each other in at least two planes along the Z axis (relative to the user/listener) to more accurately and precisely image sound sources that tilt relative to the user/listener's head.

Figure 5:
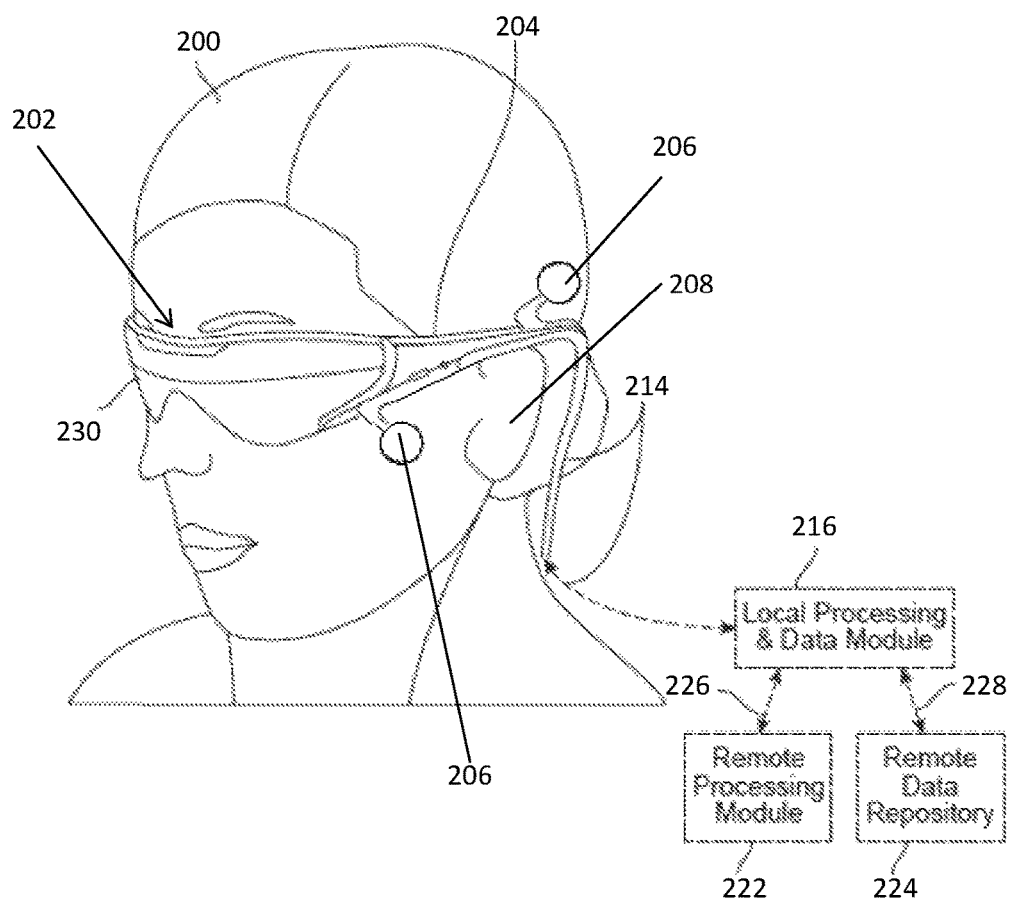
FIGS. 5 to 8 are partial perspective and partial schematic views of spatialized audio systems worn on a user/listener's head according to various embodiments.

Referring now to FIGS. 5 to 8, some exemplary spatialized audio system component options are illustrated. As shown in FIG. 5, a head-mounted spatialized audio system 202, including a frame 204 coupled to a plurality of speakers 206, is worn by a listener on a listener's head 200. The following describes possible components of an exemplary spatialized audio system 202. The described components are not all necessary to implement a spatialized audio system 202.

Figure 6:
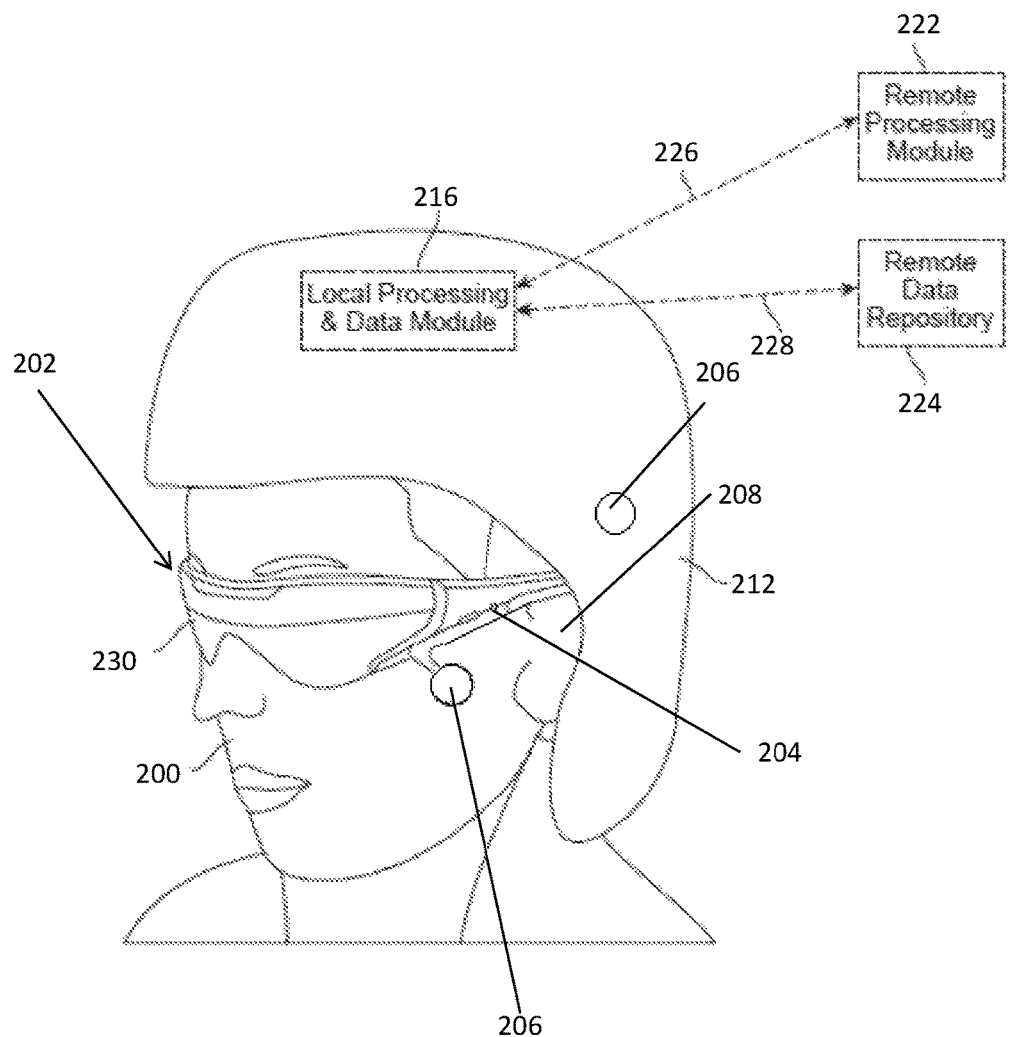
Figure 7:
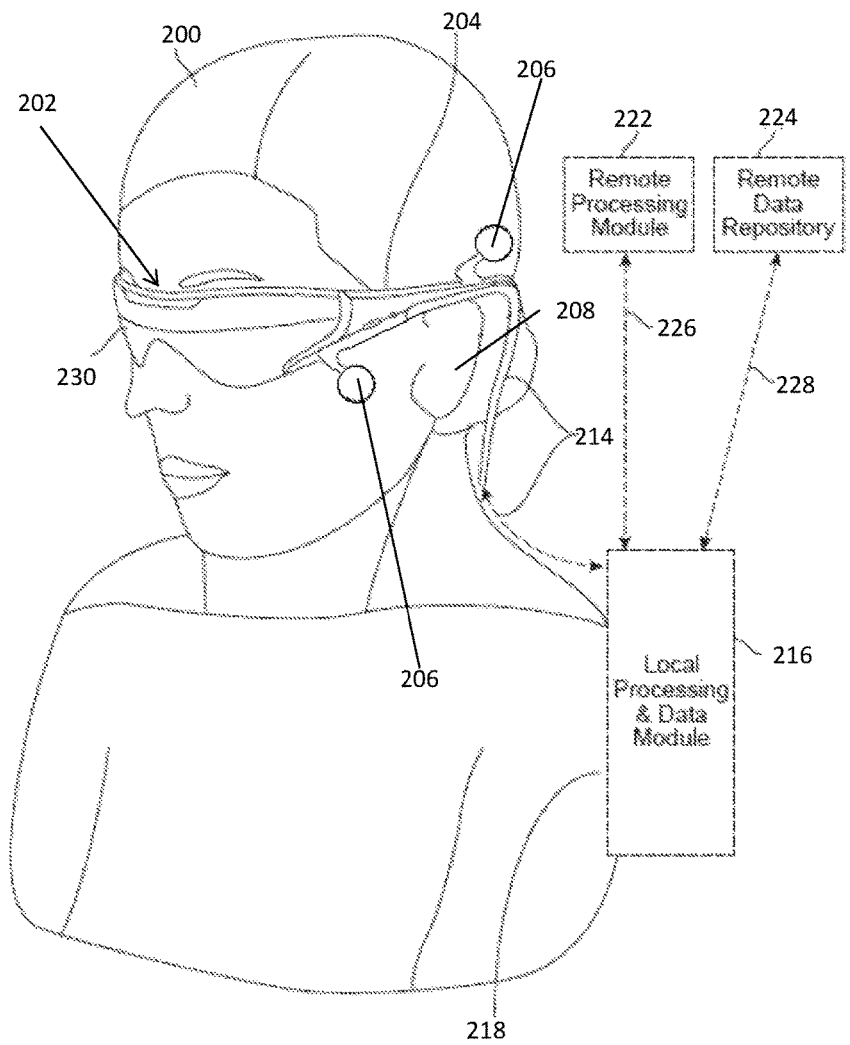
Figure 8:
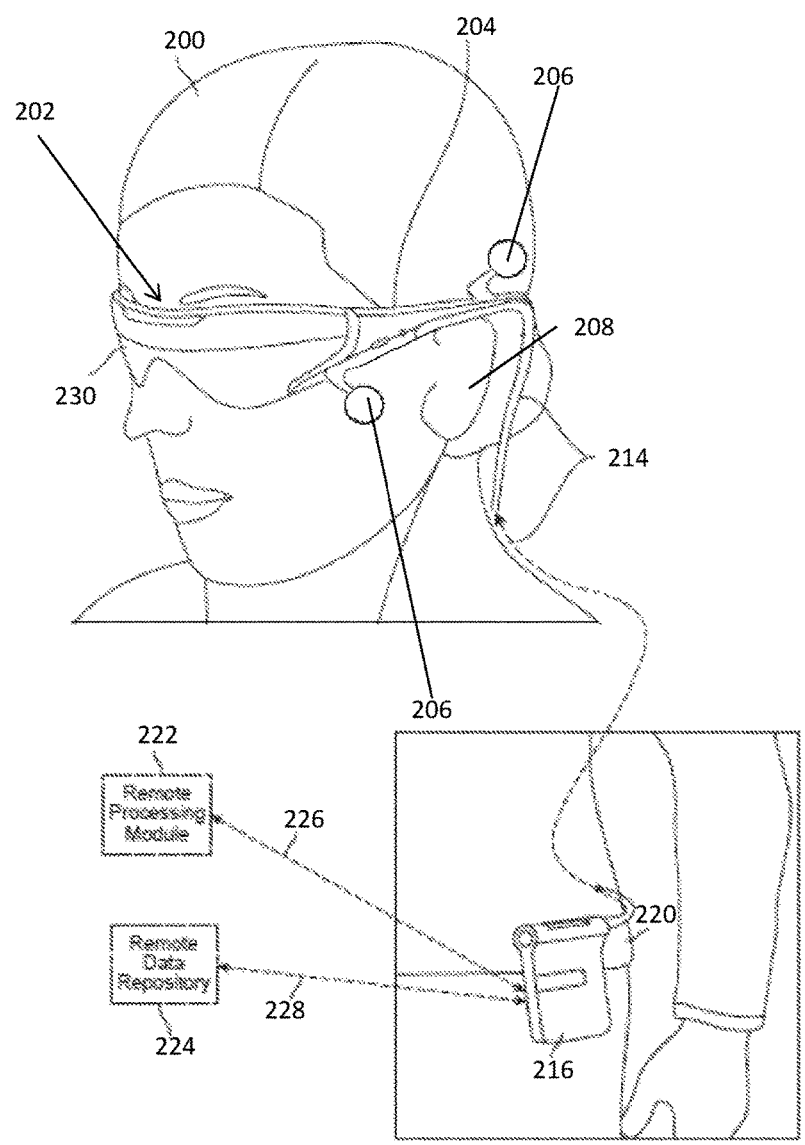

Although not shown in FIGS. 5 to 8, another pair of speakers 206 is positioned adjacent the listener's head 200 on the other side of the listener's head 206 to provide for spatialized sound. As such, this spatialized audio system 202 includes a total of four speakers 206, like the systems depicted in FIGS. 2 to 4. Although the speakers 206 in the spatialized audio systems 202 depicted in FIGS. 5, 7 and 8 are attached to respective frames 204, some or all of the speakers 206 of the spatialized audio system 202 may be attached to or embedded in a helmet or hat 212 as shown in the embodiment depicted in FIG. 6.

The speakers 206 of the spatialized audio system 202 are operatively coupled, such as by a wired lead and/or wireless connectivity 214, to a local processing and data module 216, which may be mounted in a variety of configurations, such as fixedly attached to the frame 204, fixedly attached to/embedded in a helmet or hat 212 as shown in the embodiment depicted in FIG. 6, removably attached to the torso 218 of the listener in a backpack-style configuration as shown in the embodiment of FIG. 7, or removably attached to the hip 220 of the listener in a belt-coupling style configuration as shown in the embodiment of FIG. 8.

The local processing and data module 216 may comprise one or more power-efficient processors or controllers, as well as digital memory, such as flash memory, both of which may be utilized to assist in the processing, caching, and storage of data. The data may be captured from sensors which may be operatively coupled to the frame 204, such as image capture devices (such as visible and infrared light cameras), inertial measurement units ("IMU", which may include accelerometers and/or gyroscopes), compasses, microphones, GPS units, and/or radio devices. Alternatively or additionally, the data may be acquired and/or processed using a remote processing module 222 and/or remote data repository 224, possibly to facilitate/direct generation of sound by the speakers 206 after such processing or retrieval. The local processing and data module 216 may be operatively coupled, such as via a wired or wireless communication links 226, 228, to the remote processing module 222 and the remote data repository 224 such that these remote modules 222, 224 are operatively coupled to each other and available as resources to the local processing and data module 216.

In one embodiment, the remote processing module 222 may comprise one or more relatively powerful processors or controllers configured to analyze and process audio data and/or information. In one embodiment, the remote data repository 224 may comprise a relatively large-scale digital data storage facility, which may be available through the Internet or other networking configuration in a "cloud" resource configuration. However, to minimize system lag and latency, virtual sound rendering (especially based on detected pose information) may be limited to the local processing and data module 216. In one embodiment, all data is stored and all computation is performed in the local processing and data module 216, allowing fully autonomous use from any remote modules.

In one or more embodiments, the spatialized audio system is typically fitted for a particular listener's head, and the speakers are aligned to the listener's ears. These configuration steps may be used in order to ensure that the listener is provided with an optimum spatialized audio experience without causing any physiological side-effects, such as headaches, nausea, discomfort, etc. Thus, in one or more embodiments, the listener-worn spatialized audio system is configured (both physically and digitally) for each individual listener, and a set of programs may be calibrated specifically for the listener. For example, in some embodiments, the listener worn spatialized audio system may detect or be provided with respective distances between speakers of the head worn spatialized audio system and the listener's ears, and a 3-D mapping of the listener's head. All of these measurements may be used to provide a head-worn spatialized audio system customized to fit a given listener. In other embodiments, such measurements may not be necessary in order to perform the spatialized audio functions. For example, a loose fitting spatialized audio system may be used comfortably by a variety of listeners, although possibly with less accurate spatialization of virtual audio sources.

Although not needed to implement a spatialized audio system, a display 230 may be coupled to the frame 204 (e.g., for an optical AR/MR experience in addition to the spatial audio experience), as shown in FIGS. 5 to 8. Exemplary AR/MR displays are described in U.S. Utility patent application Ser. Nos. 14/738,877 and 14/555,585, the contents of which have been previously incorporated-by-reference herein. In embodiments including a display 230, the local processing and data module 216, the remote processing module 222 and the remote data repository 224 may process 3-D video data in addition to spatial audio data.

Figure 9:
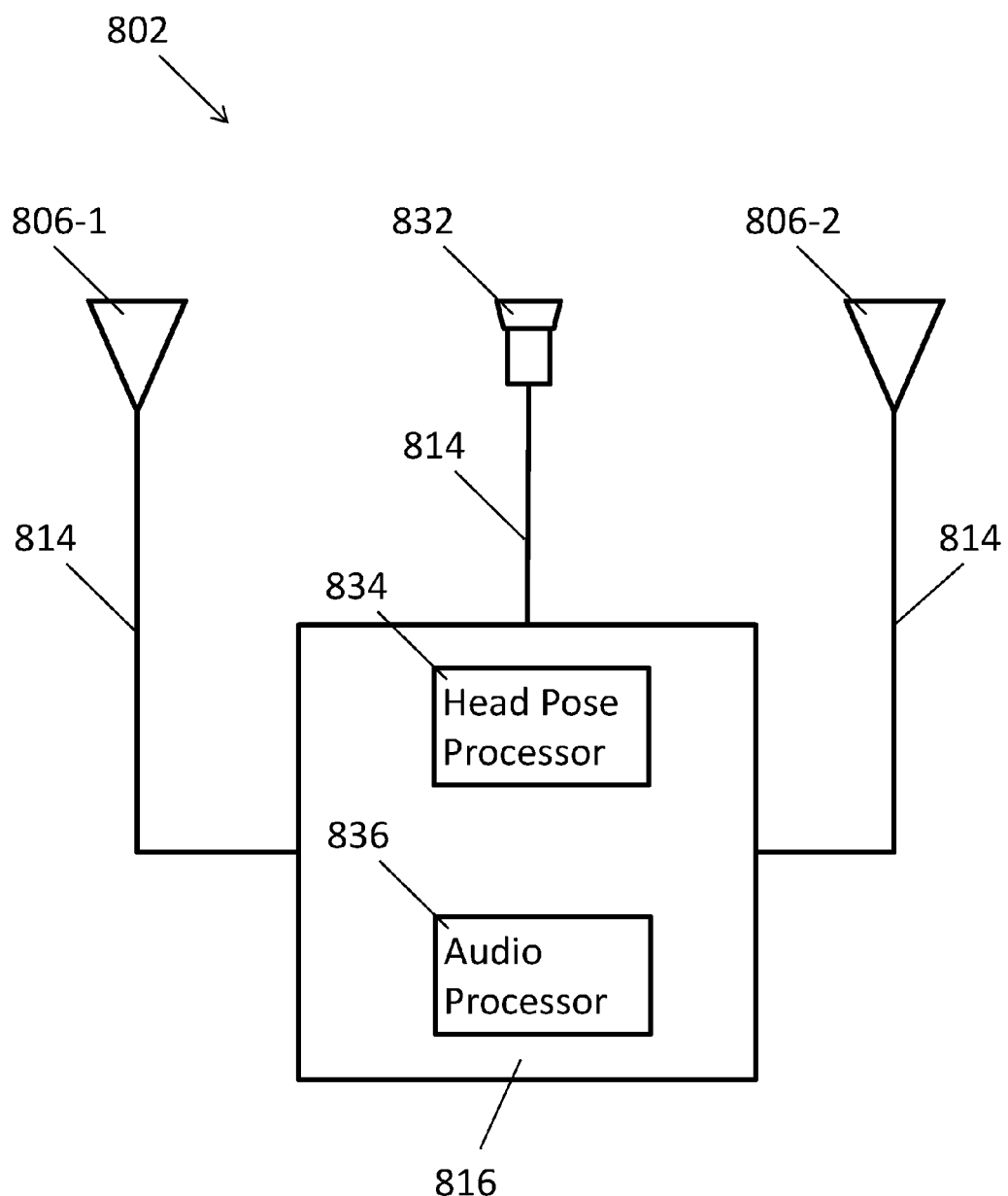
FIG. 9 is a detailed schematic view of a pose-sensitive spatialized audio system according to one embodiment.

FIG. 9 depicts a pose-sensitive spatialized audio system 802, according to one embodiment, including a plurality of speakers 806-1, 806-2 operatively coupled to a local processing and data module 816 via wired lead and/or wireless connectivity 814. The pose-sensitive spatialized audio system 802 also includes a head pose sensor 832 operatively coupled to the local processing and data module 816 via wired lead and/or wireless connectivity 814. The head pose sensor 832 is configured to collect head pose data of a listener/user. The head pose sensor 832 may include one or more of image capture devices (such as visible and infrared light cameras), inertial measurement units (IMU, including accelerometers and gyroscopes), compasses, microphones, GPS units, or radio devices. While the pose-sensitive spatialized audio system 802 depicted in FIG. 9 includes only two speakers 806-1, 806-2, spatialized audio systems according to other embodiments may include more speakers.

The pose-sensitive spatialized audio system 802 further includes a head pose processor 834 to determine a head pose (e.g., position and orientation) of a listener/user wearing the pose-sensitive spatialized audio system 802 based on at least the head pose data collected by the head pose sensor 832. As used in this application, "head pose processor," includes, but is not limited to, one or more separate and independent software and/or hardware components of a computer that must be added to a general purpose computer before the computer can determine a head pose, and computers having such components added thereto.

The pose-sensitive spatialized audio system 802 further includes a spatialized audio processor 836 to generate spatialized audio data for spatialized audio to be delivered to a listener/user wearing the pose-sensitive spatialized audio system 802 based on at least the head pose determined by the head pose processor 834. The generated spatialized audio data may include content, position, orientation and volume data for each virtual audio source in a spatialized sound field. As used in this application, "audio processor," includes, but is not limited to, one or more separate and independent software and/or hardware components of a computer that must be added to a general purpose computer before the computer can generate spatialized audio data, and computers having such components added thereto. The spatialized audio processor 836 may also generate audio signals for the plurality of speakers 806-1, 806-2 based on the spatialized audio data to deliver spatialized audio to the listener/user. The pose-sensitive spatialized audio system 802 schematically depicted in FIG. 9 may be divided into components in a manner similar to the spatialized audio systems 202 depicted in FIGS. 5-8.

Figure 10:
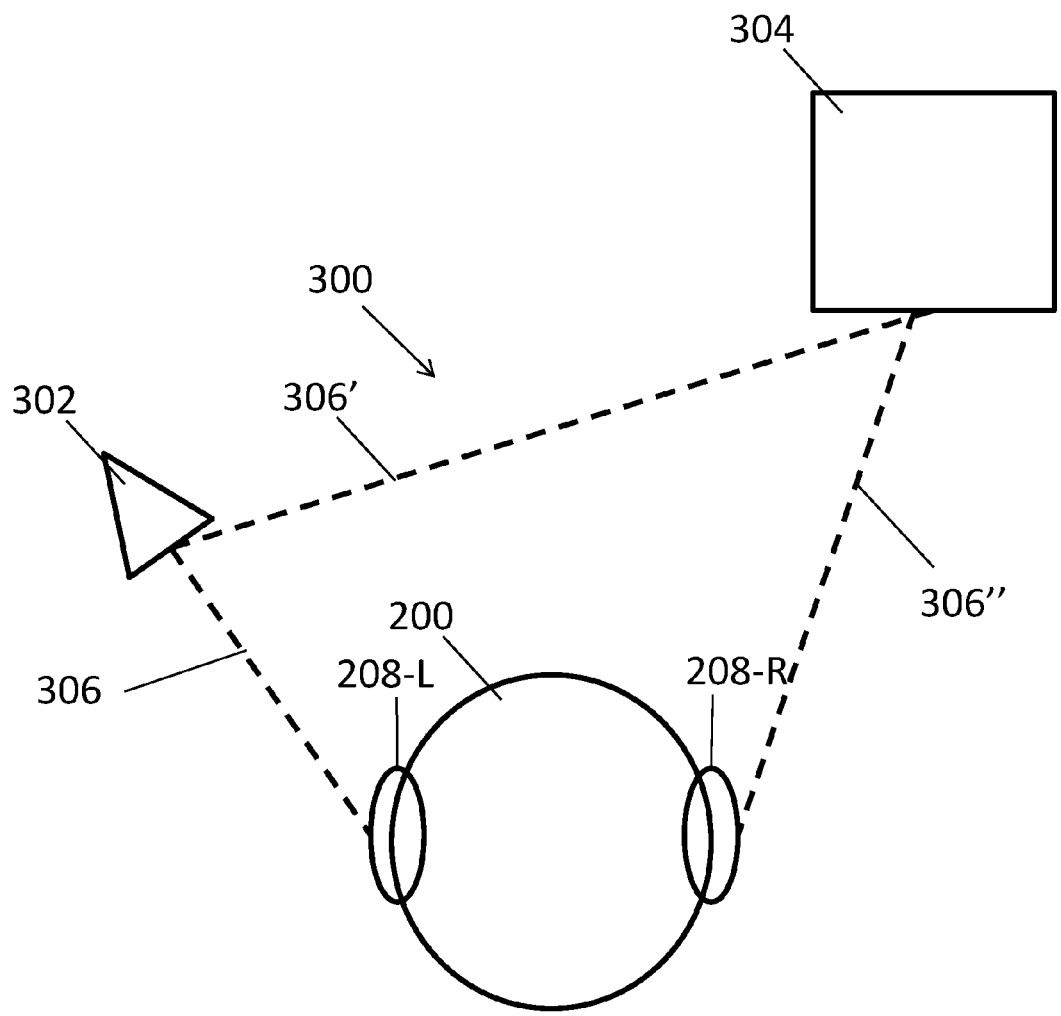
FIG. 10 is a schematic view of a spatialized sound field generated by a real physical audio source.

FIG. 10 depicts a spatialized sound field 300 as generated by a real physical audio source 302. The real physical sound source 302 has a location and an orientation. The real physical sound source 302 generates a sound wave having many portions. Due to the location and orientation of the real physical sound source 302 relative to the listener's head 200, a first portion 306 of the sound wave is directed to the listener's left ear 208-L. A second portion 306' of the sound wave is directed away from the listener's head 200 and toward an object 304 in the spatialized sound field 300. The second portion 306' of the sound wave reflects off of the object 304 generating a reflected third portion 306", which is directed to the listener's right ear 208-R. Because of the different distances traveled by the first portion 306 and second and third portions 306', 306" of the sound wave, these portions will arrive at slightly different times to the listener's left and right ears 208-L, 208-R. Further, the object 304 may modulate the sound of the reflected third portion 306" of the sound wave before it reaches the listener's right ear 208-R.

Even when no object 304 is present, sound waves from the real physical sound source 302 will be heard in both ears 208-L, 208-R of the listener. If the sound source 302 is disposed to the left of the listener (as in FIG. 10), the sound waves issuing therefrom may be heard by the listener such that the sound may appear earlier in the left ear 208-L and later (e.g., 800 microseconds) in right ear 208-R. In fact, the auditory center of the human brain analyzes this delay to locate sources of spatialized sound. The sound may also appear to be louder in the left ear 208-L compared to the right ear 208-R.

The spatialized sound field 300 depicted in FIG. 10 is a fairly simple one including only one real physical sound source 302 and one object 304. A spatialized audio system 202 reproducing even this simple spatialized sound field 300 must account for various reflections and modulations of sound waves. Spatialized sound fields with more than one sound source and/or more than on object interacting with the sound wave(s) therein are exponentially more complicated. Spatialized audio systems 202 must be increasingly powerful to reproduce these increasingly complicated spatialized sound fields. While the spatialized audio processor 236 depicted in FIG. 9 is a part of the local processing and data module 216, more powerful spatialized audio processor 236 in other embodiments may be a part of the remote processing module 222 in order to conserve space and power at the local processing and data module 216.

Spatialized Audio Experience

Figure 11:
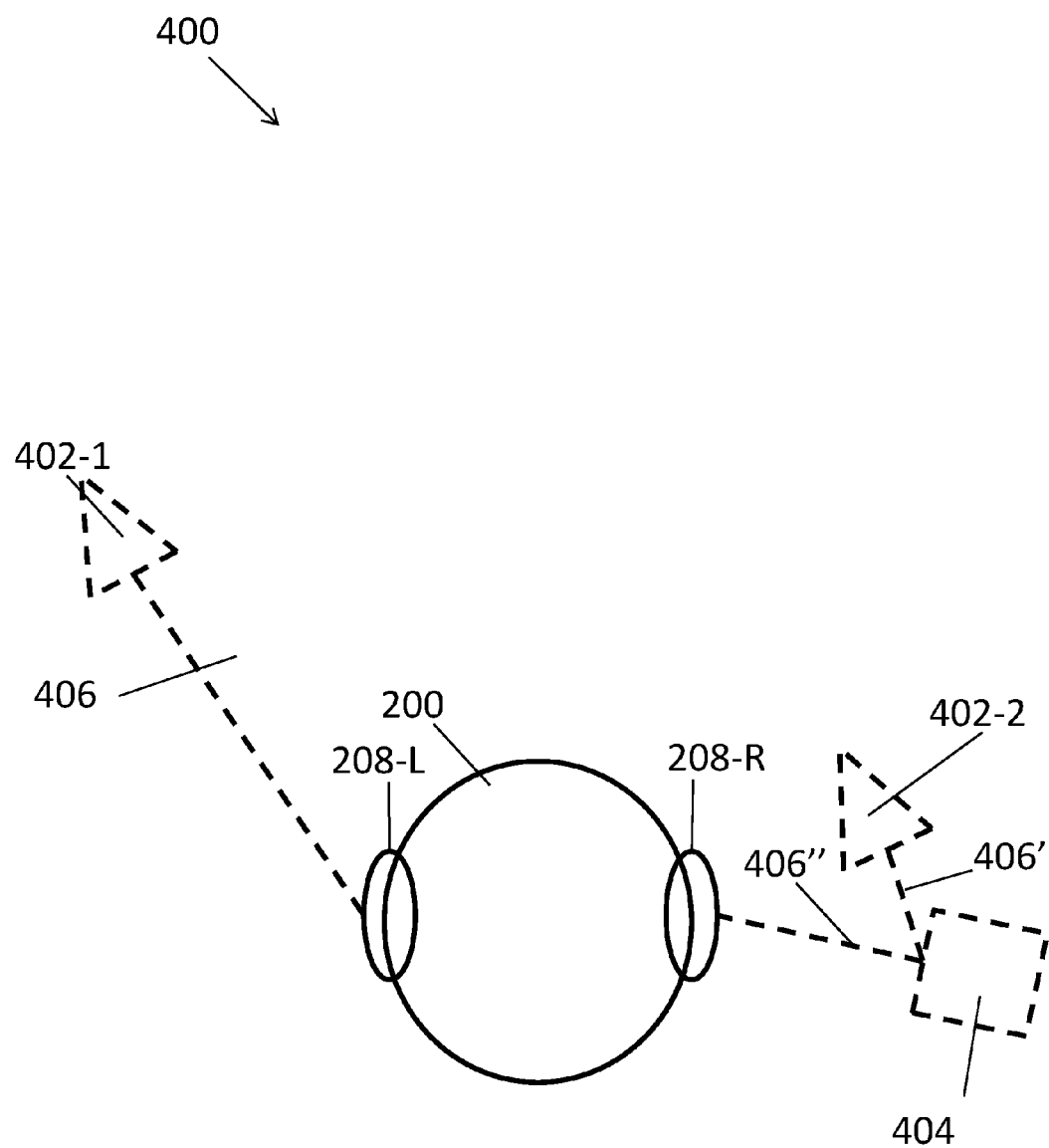
FIG. 11 is a back schematic view of a spatialized audio experience including various virtual sound sources and a virtual object according to one embodiment.

FIG. 11 depicts, from a forward facing perspective view behind the user/listener's head 200, a spatialized audio experience 400 according to one embodiment. In order to implement the spatialized audio experience 400, the spatialized audio system is provided with relative positions and orientations of a user/listener and a plurality of speakers. For instance, the user/listener may wear a head-mounted spatialized audio system (not shown) with a known "fit."

The spatialized audio experience 400 includes first and second virtual audio sources 402-1, 402-2. These virtual audio sources 402-1, 402-2 may correspond to visual information presented to the user. For instance, first virtual audio source 402-1 may correspond to a virtual character in an AR/MR experience, and second virtual audio source 402-2 may correspond to a virtual horn in the AR/MR experience. The virtual character and the virtual horn may be displayed to the user on a display coupled to the frame of a spatialized audio/AR/MR system (not shown in FIG. 11, see FIGS. 5 to 8). In other embodiments, virtual audio sources 402-1, 402-2 may not correspond to any visual information.

FIG. 11 also depicts a portion 406 of the sound wave corresponding to the first virtual audio source 402-1 (i.e., the virtual character), which is directed to the listener's left ear 208-L. FIG. 11 further depicts a first portion 406' of the sound wave corresponding to the second virtual audio source 402-2 (i.e., the virtual horn), which is directed to a virtual object 404. The first portion 406' reflects off of the virtual object 404 forming a second portion 406", which is directed to listener's right ear 208-R.

Figure 12:
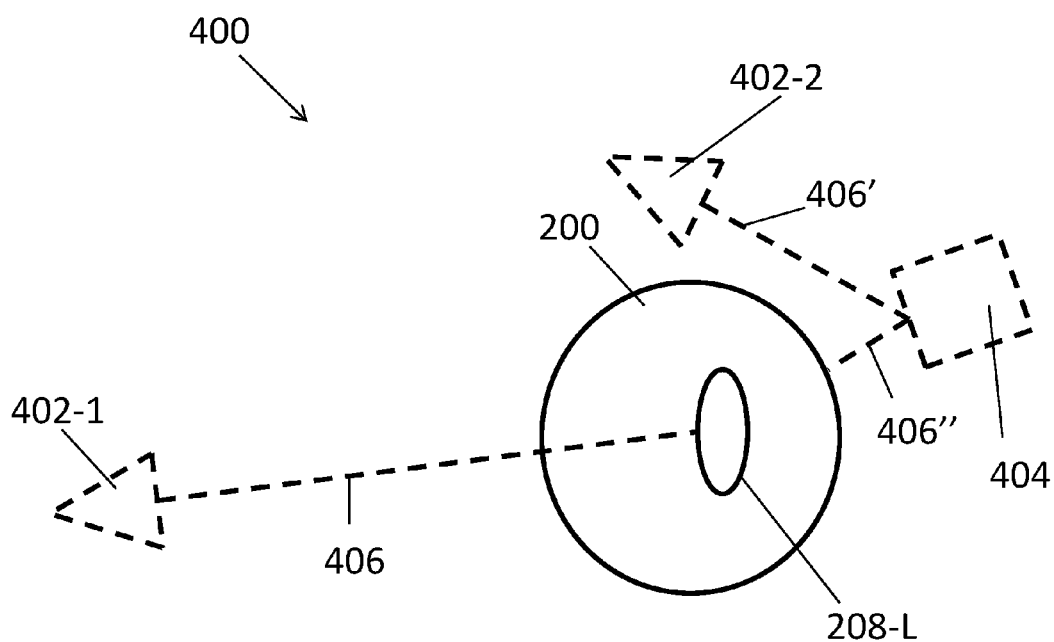
FIG. 12 is a side schematic view of the spatialized audio experience depicted in FIG. 11.

FIG. 12 depicts, from a side view, the spatialized audio experience 400 embodiment depicted in FIG. 11. FIG. 12 shows that the first virtual audio source 402-1 (i.e., the virtual character) is virtually located slightly below the listener's left ear 208-L. FIG. 12 also shows that the second virtual audio source 402-2 (i.e., the virtual horn) is virtually located slightly above the listener's right ear 208-R, and the virtual object 404 has a virtual height between the listener's right ear 208-R and the second virtual audio source 402-2.

In some embodiments, the first and second virtual audio sources 402-1 (i.e., the virtual character) and 402-2 (i.e., the virtual horn) are displayed using an AR/MR display 204. The AR/MR display can be configured to display the second virtual audio source 402-2 (and any other virtual object) in a "world-centric" view such that the virtual location of the second virtual audio source 402-2 is set in the virtual world independent of the position or pose of the viewer. Accordingly, if viewers turn their heads away from the second virtual audio source 402-2, they will no longer see the virtual object.

While the first and second virtual audio sources 402-1, 402-2 do not have actual physical locations, their virtual locations are important in rendering the respective spatialized audio corresponding to the first and second virtual audio source 402-1, 402-2. While the spatialized audio experience 400 depicted in FIGS. 11 and 12 include only two virtual audio sources 402-1, 402-2, other spatialized audio experiences may include more or fewer virtual audio sources. For instance, a typical movie scene may include many virtual audio sources, such as background music, background noise, sounds associated with physical actions, and dialogue. Reproducing these many virtual audio sources accurately increases the listener's enjoyment of the spatialized audio experience.

The spatialized audio experience 400 has been described with reference to the embodiments of AR/MR and spatialized audio systems herein used to generate and deliver the experience 400. Other video and audio systems may be configured to deliver a spatialized audio experience 400, albeit with different levels of accuracy and precision.

While a spatialized audio experience is generally described above, some spatialized audio experiences take into account the pose of the user/listener. For instance, audio rendering may be modified based on a detected pose of the user/listener, as described below.

Pose-Sensitive Spatialized Audio System

Figure 13:
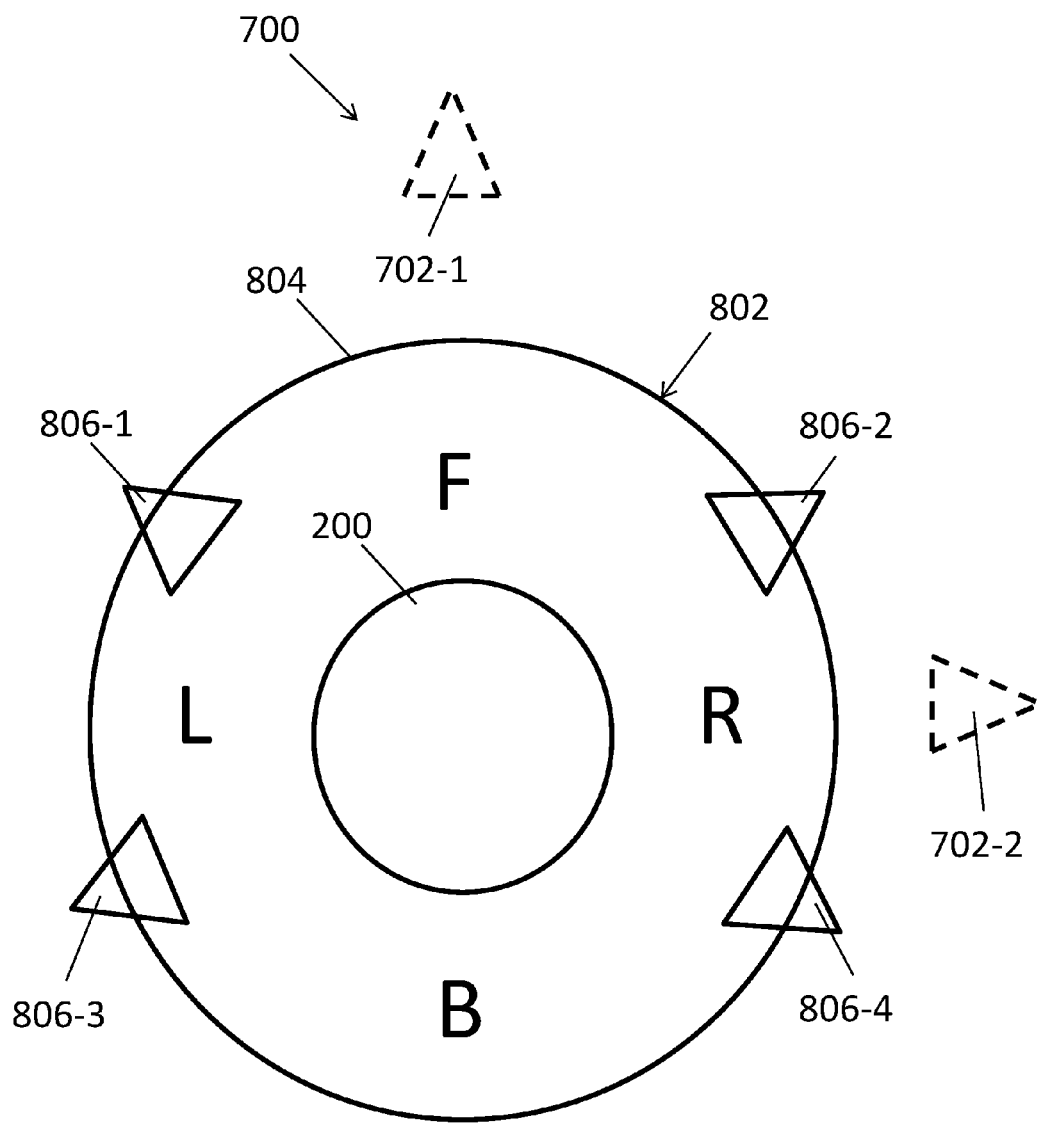
FIGS. 13 and 14 are top views of a user/listener receiving a pose-sensitive spatialized audio experience according to one embodiment, in FIG. 13, the user/listener is facing forward, while in FIG. 14, the user/listener is facing to the left.

FIG. 13 depicts, from a top view, a pose-sensitive spatialized audio system 802 configured to present a pose-sensitive spatialized audio experience 700 to a user. For instance, the pose-sensitive spatialized audio experience 700 includes first and second virtual audio sources 702-1, 702-2. First virtual audio source 702-1 may correspond to a virtual character in an AR/MR experience, and second virtual audio source 702-2 may correspond to a virtual horn in the AR/MR experience. The spatialized audio experience 700 is a "world-centric" experience, in which the virtual audio sources 702-1, 702-2 have respective virtual locations in the world independent of the user's pose.

The user is wearing a spatialized audio system 802 includes a frame 804 and four speakers 806-1, 806-2, 806-3, 806-4 attached to the frame 804. Speaker 806-1 is attached to the frame 804 such that, when the spatialized audio system 802 is worn on the listener's head 200, speaker 806-1 is forward F and to the left L of the listener's head 200. Speaker 806-2 is attached to the frame 804 such that, when the spatialized audio system 802 is worn on the listener's head 200, speaker 806-2 is forward F and to the right R of the listener's head 200. Speaker 806-3 is attached to the frame 804 such that, when the spatialized audio system 802 is worn on the listener's head 200, speaker 806-3 is behind B and to the left L of the listener's head 200. Speaker 806-4 is attached to the frame 804 such that, when the spatialized audio system 802 is worn on the listener's head 200, speaker 806-4 is behind B and to the right R of the listener's head 200. All of the speakers 806-1, 806-2, 806-3, 806-4 are pointed toward the listener's head 200.

With the user's head 200 in the pose shown in FIG. 13, virtual sound from the first and second virtual audio sources 702-1, 702-2 should appear to emanate from the front F and right R of the user's head 200, respectively. Accordingly, virtual sound corresponding to the first virtual audio source 702-1 may be emitted from the speakers 806-1, 806-2 located in front F of the user's head 200. Similarly, virtual sound corresponding to the second virtual audio source 702-2 may be emitted from the speakers 806-2, 806-4 located to the right R of the user's head 200. Rendering the audio data such that virtual sound is emitted from the speakers results in a spatialized audio experience consistent with the virtual positions of the first and second virtual audio sources 702-1, 702-2.

Figure 14:
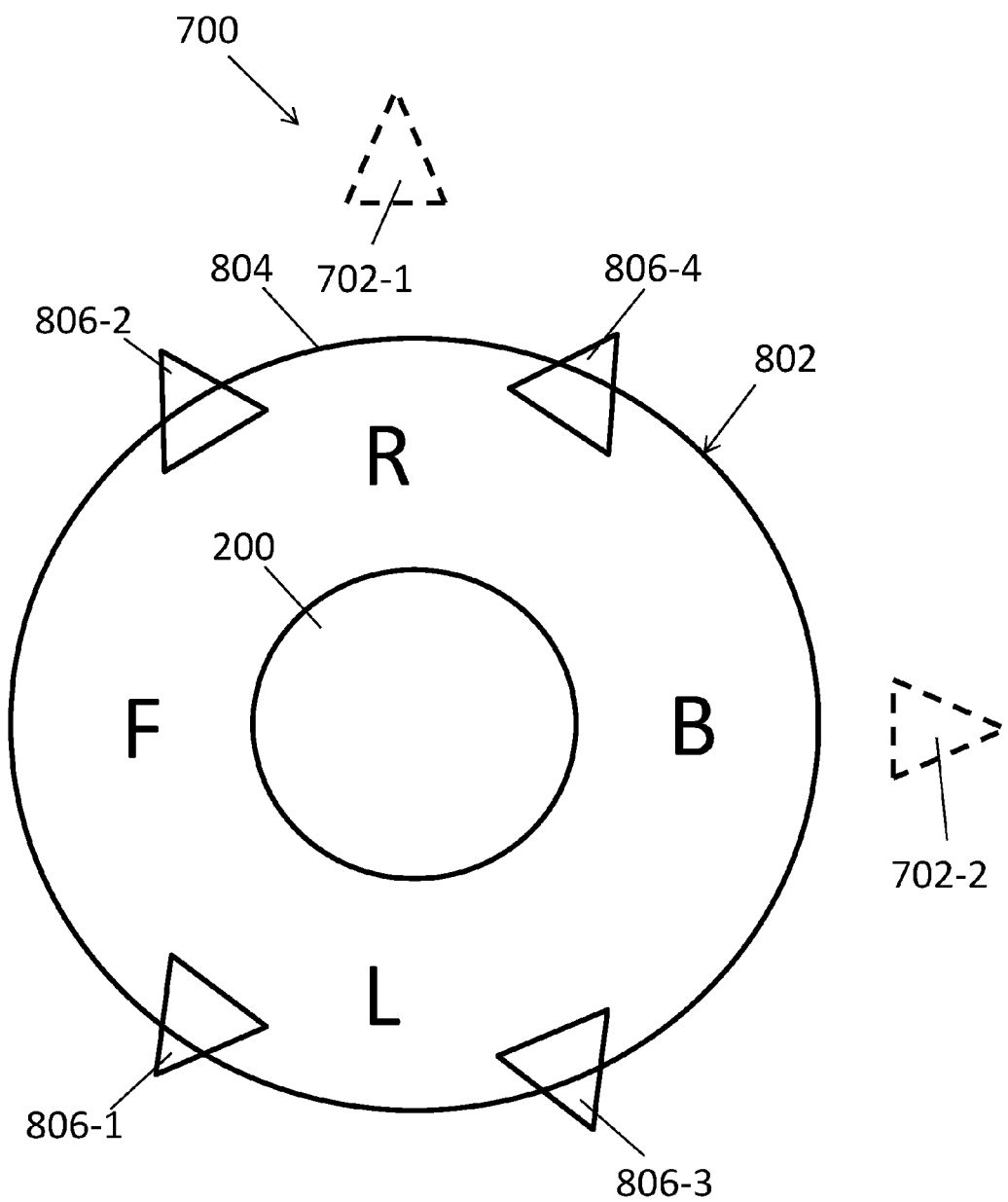

FIG. 14 depicts, from a top view similar to the one in FIG. 13, the pose-sensitive spatialized audio system 802 presenting the same pose-sensitive spatialized audio experience 700 depicted in FIG. 13 to the user. In FIG. 14 however, the user/listener's head 200 along with the spatialized audio system 802 worn thereon have been turned 90° to the left. In this configuration, the frame of reference of the spatialized audio system 802 has been rotated 90° to the left. As such, the right side R of the user/listener's head 200 is facing the first virtual audio source 702-1, while the back B of the user/listener's head 200 is facing the second virtual audio source 702-2.

With the user's head 200 in the pose shown in FIG. 14, virtual sound from the first and second virtual audio sources 702-1, 702-2 should appear to emanate from the right R and back B of the user's head 200, respectively. Accordingly, virtual sound corresponding to the first virtual audio source 702-1 may be emitted from the speakers 806-2, 806-4 located to the right R of the user's head 200. Similarly, virtual sound corresponding to the second virtual audio source 702-2 may be emitted from the speakers 806-3, 806-4 located to the back B of the user's head 200. Rendering the audio data such that virtual sound is emitted from the appropriate speakers while taking into account the pose of the user/listener results in a spatialized audio experience consistent with the virtual positions of the first and second virtual audio sources 702-1, 702-2. Such a pose-sensitive spatialized audio experience promotes a believable or passable virtual world with virtual objects that are disposed in a world-centric manner.

As explained above with respect to the pose-sensitive spatialized audio system 802 depicted in FIG. 9, the spatialized audio system 802 has access to a head pose of the user/listener and utilizes that head pose to render audio data and present audio corresponding to the audio data. The presented audio is consistent with the virtual object and the position of the user/listener's head 200. For instance, a sound in the pose-sensitive spatialized audio experience 700, such as the one corresponding to the second virtual audio source 702-2 (the virtual horn), should be presented such that the user/listener perceives the audio source as being located to the right and slightly above the listener's head 200 (see FIGS. 11 and 12). In this manner, the spatialized audio system 802 can more accurately and precisely produce spatialized audio for each user/listener.

While the spatialized audio system 802 depicted in FIGS. 13 and 14 includes four speakers 806-1, 806-2, 806-3, 806-4, other spatialized audio systems may include fewer or more speakers 806. The number, type, position and orientation of speakers 806 may be coordinated to optimize presentation of spatialized audio to the users/listeners. For instance, larger speakers (e.g., subwoofers) may be used to present low frequency sounds while the smaller speakers may be used to present high frequency and middle frequency sounds.

Having described various aspects of spatialized audio systems according to various embodiments, methods for presenting spatialized audio (e.g., in a spatialized audio experience) using spatialized audio systems (e.g., 202, 802) will now be described. The described methods are pose-sensitive to generate a more accurate and precise spatialized audio experience. In addition, the described methods include late-frame time warp audio processing to reduce the amount of system lag/latency related artifacts.

Sensory Latency and Audio Processing

As described above, sensory latency causes problems (e.g., artifacts) in spatialized audio systems with virtual sound sources "stuck" in a world-centric manner to the virtual world when the spatialized audio system's information regarding the user/listener's head pose changes between the time that a pose sensor captures motion (e.g., of head and/or body resulting in head pose change), and the time that audio data is rendered based on that motion and corresponding sound is presented to the user/listener. An exemplary sensory latency artifact is virtual sound corresponding to a virtual object appearing to emanate from a virtual location different than the virtual location of the virtual object. Rotating and tilting of the user/listener's head is more of a sensory latency problem than translating the user/listening's head because of the limited ability of a head to change translational direction quickly compared to rotational direction. The speed of direction change determines the type of change resulting in sensory latency problems because the typical time between pose or motion capture and virtual sound presentation is on the order of milliseconds ("ms").

The human brain is adept at differentiating sounds (e.g., beats), and locating source sources in rotational planes (e.g., front, right, back, left in FIG. 3.) Therefore, audio "frames" must be generated/updated about every 4-10 ms to present a realistic spatialized audio experience for the user/listener. In comparison, visual "frames" displayed to present a realistic visual experience (e.g., a motion picture) can be generated/updated about every 8-17 ms.

Audio processing is different from video processing because while video processing typically merges shapes into one or more flat projected planes, audio processing merges multiple sound sources (e.g., "speakers") with distinct positions and orientations into a number of channels for sound detectors (e.g., "microphones"). While audio processing is described as merging sound sources, it is audio data corresponding to those sound sources that are "merged."

Late-Frame Time Warp Audio Processing

Figure 15:
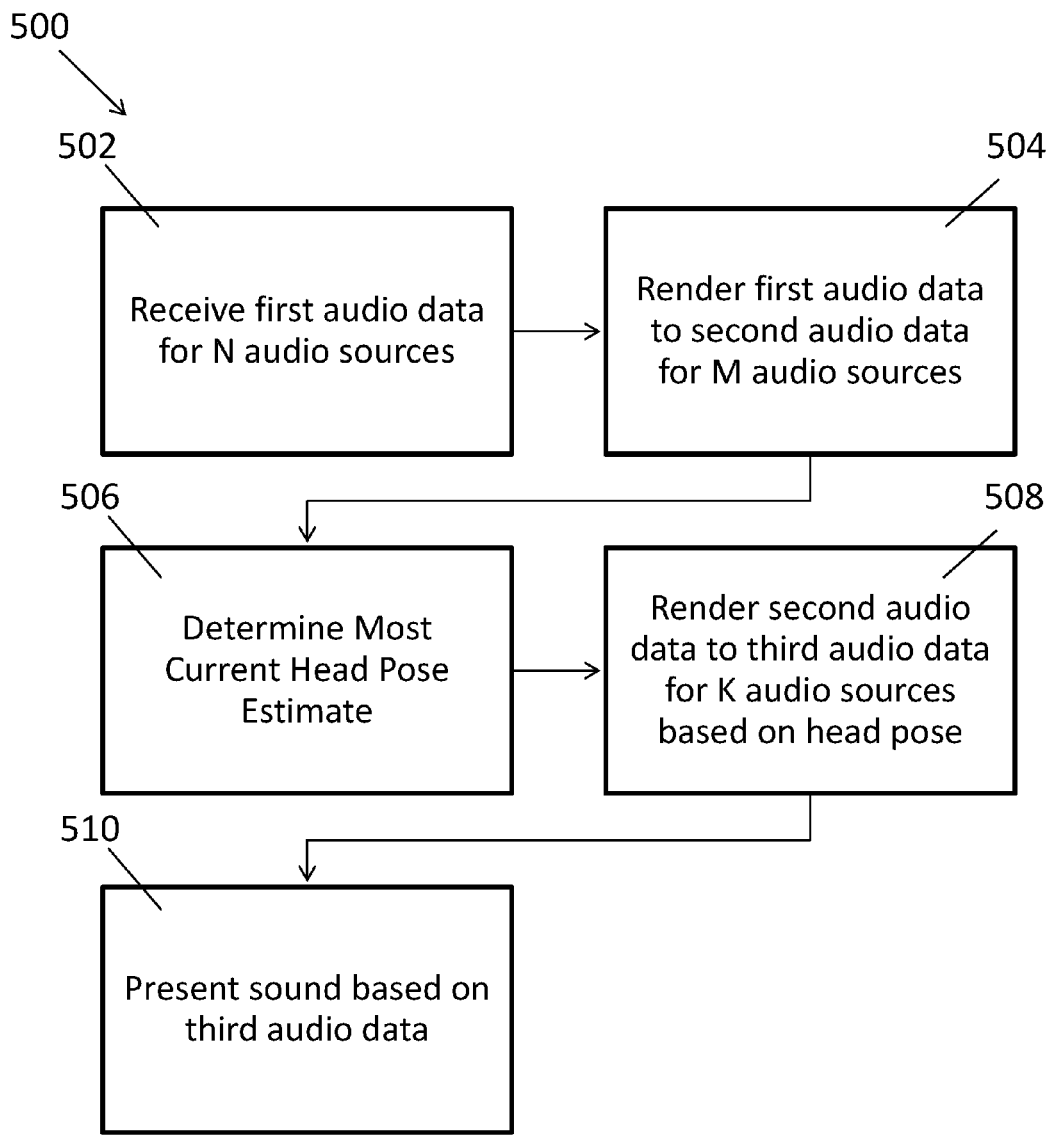
FIGS. 15 and 17 are flowcharts depicting methods of late-frame time warp, pose-sensitive audio processing utilizing a spatialized audio system according to two embodiments.

FIG. 15 depicts a method 500 of pose-sensitive audio processing that minimizes sensory latency artifacts according to one embodiment. The pose-sensitive audio processing method 500 utilizes a late-frame time warp technique to minimize lag/latency between detecting a pose change and generating sound based on the detected pose change. The method 500 may be implemented utilizing the spatialized audio systems 802 described above, for example. In brief, the method 500 divides audio processing into two stages: a first stage partially processing the audio data into an intermediate format; and a computationally less intensive/taxing second stage rapidly completing the processing utilizing pose data.

At step 502, the spatialized audio system 802 (e.g., the audio processor 236 thereof) receives first audio data for (i.e., corresponding to) a first plurality (e.g., N) of audio sources. The source audio data corresponds to sound intended to be delivered to the user/listener via the speakers 806 of the spatialized audio system 802. The source audio data may be received from a database via a wired or wireless connection substantially simultaneously with generation/delivery of sound. Alternatively, the source audio data may be received prior to generation/delivery of sound and stored on the spatialized audio system 802.

Figure 16:
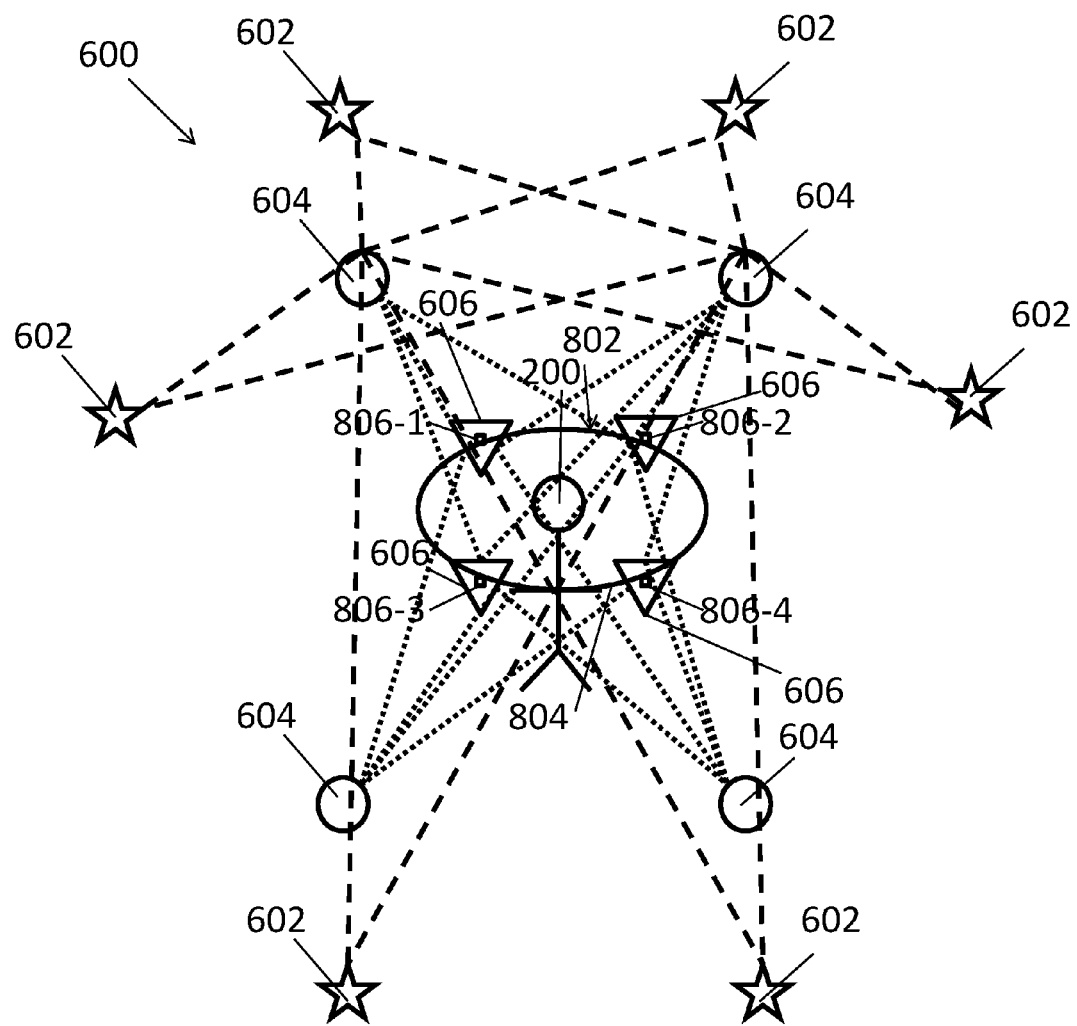
FIG. 16 schematically depicts late-frame time warp audio processing according to one embodiment.

FIG. 16 schematically depicts late-frame time warp audio processing method 600 according to one embodiment. Each of the first plurality of audio sources 602 corresponding to the first audio data is depicted as a star. As shown in FIG. 16, the first plurality of audio sources 602 includes six audio sources 602. Of course, the number of audio sources 602 is arbitrary in this embodiment, and is not intended to be limiting. Each of the first plurality of audio sources 602 may correspond to a virtual sound source.

At step 504, the spatialized audio system 802 (e.g., the audio processor 236 thereof) renders/processes/transforms the first audio data to a second audio data for (i.e., corresponding to) a second plurality (e.g., M) of audio sources. Step 504 corresponds to the first stage of the two-stage audio processing described above. The first stage is also known as a "merge phase" of the process. The number of audio sources in the second plurality (e.g., M) may be lesser than or equal to the number of audio sources in the first plurality (e.g., N). Reducing the number of audio sources in the second plurality simplifies the audio processing in the second stage (described below). The number of audio sources in the second plurality (e.g., M) may theoretically be greater than the number of audio sources in the first plurality (e.g., N), but this model may not result in a computationally less intensive second stage. The first stage of the two-stage audio processing in step 504 may also take into account a pose (e.g., head pose) estimate of the user/listener currently wearing the spatialized audio system 802 (see FIG. 17).

In FIG. 16, each of the second plurality of audio sources 604 corresponding to the first audio data is depicted as a circle. Each of the second plurality of audio sources 604 is a virtual microphone/speaker that functions as an intermediate node in the two-stage audio processing. These audio sources 604 are virtual microphones in that the first stage audio processing in step 504 renders each of the second plurality of audio sources 604 by "recording" the virtual sound generated by each of the first plurality of audio sources 602 at the location of each of the second plurality of audio sources 604. As such, each of the second plurality of audio sources 604 may include audio data from each of the first plurality of audio sources 602. This is depicted in FIG. 16 by dashed lines connecting each of the first plurality of audio sources 602 to each of the second plurality of audio sources 604. These audio sources 604 are virtual speakers in that in the second stage audio processing (described below), the second plurality of audio sources 604 function as source of sound for audio processing.

These audio sources/intermediate nodes 604 float in 3-D space around the user/listener's head, but are not necessarily tied to it. In particular, at the beginning of the first audio render stage, the audio sources/intermediate nodes 604 may be positioned in space based on the then-best estimate of the user's head pose, and they could remain there for the duration of that audio block. In the second audio render stage, sound from those locations may be rendered based on the user's new-best estimated pose. In some embodiments, the audio sources/intermediate nodes 604 of the second plurality are disposed in more than one plane (i.e., at more than one vertical height) to more accurately render audio data corresponding to virtual sound sources disposed in 3-D space. In some embodiments, the number of audio sources/intermediate nodes 604 of the second plurality is less than eight to reduce the computational complexity of the second stage (described below). In some embodiments, the audio sources/intermediate nodes 604 of the second plurality are disposed from about 6 inches (15.24 cm) to about 12 inches (30.48 cm) from the listener's head. In some embodiments, the intermediate nodes 604 are fixed in a local coordinate system with an origin locked to user's head position, but an orientation locked to a common world coordinate system corresponding to an inertial reference frame of the user's environment.

At step 506, the spatialized audio system 802 (e.g., the head pose processor 234 thereof) determines a most current pose estimate (e.g., head pose) of the user/listener currently wearing the spatialized audio system 802. As part of determining a most current pose estimate, the spatialized audio system 802 may collect the most recently available pose data (e.g., head pose data through the head pose sensor 232). The head pose sensor 232 may include one or more of image capture devices (such as visible and infrared light cameras), inertial measurement units (including accelerometers and gyroscopes), compasses, microphones, GPS units, and radio devices. The head pose sensor 232 may collect head pose data in the form of one or more of images, acceleration and gyroscopic information, compass information, sounds, GPS information, and radio transmissions. All of this data may be used to determine a head pose of a user/listener. The calculations performed by the head pose processor 234 vary depending on the type(s) of pose data collected (e.g., through the head pose sensor 232).

At step 508, the spatialized audio system 802 (e.g., the audio processor 236 thereof) renders/processes/transforms the second audio data to a third audio data for (i.e., corresponding to) a third plurality (e.g., K) of audio sources. Step 508 corresponds to the second stage of the two-stage audio processing described above. The number of audio sources in the third plurality (e.g., K) may be lesser than or equal to the number of audio sources in the second plurality (e.g., M). The number of audio sources in the third plurality (e.g., K) may theoretically be greater than the number of audio sources in the second plurality (e.g., M), but this model will be less common.

In FIG. 16, each of the third plurality of audio sources 606 corresponding to the third audio data is depicted as a triangle. The third plurality of audio sources 606 includes four audio sources 606. Of course, the number of audio sources 602 is arbitrary in this embodiment, and is not intended to be limiting. Each of the third plurality of audio sources 606 may correspond to a physical speaker 806. During the second stage in step 508, the audio processor 236 has access to the exact virtual spatial location of each of the second plurality of audio sources/intermediate nodes 604. This information reduced the computational complexity of the second stage audio processing and system latency.

For the purpose of rendering audio data, each of the third plurality of audio sources 606 is functions as a virtual microphone as described above. These audio sources 606 function as virtual microphones in that the second stage audio processing in step 508 renders each of the third plurality of audio sources 606 by "recording" the virtual sound generated by each of the second plurality of audio sources 604 at the location of each of the third plurality of audio sources 606. As such, each of the third plurality of audio sources 606 may include audio data from each of the second plurality of audio sources 604. This is depicted in FIG. 16 by dotted lines connecting each of the second plurality of audio sources 604 to each of the third plurality of audio sources 606. As described above, these audio sources 606 correspond to real-world physical speakers 806 for presenting virtual sound to the user/listener.

During the second stage audio processing in step 508, the spatialized audio system 802 (e.g., the audio processor 236 thereof) renders/processes/transforms the second audio data to the third audio data at least partially based on the most current pose estimate determined in step 506. For instance, if the user/listener's head is turned to the left as shown in FIGS. 14 and 16, the spatialized audio system 802 will render the third audio data such that the third plurality of audio sources 606 are slightly rotated to the right. As such, virtual sound corresponding to a virtual object to the left of the user/listener appears to originate from the front of the user/listener's head. Spatialized audio data can also be rendered to take into account the pitch and roll of the user/listener's head in addition to the yaw. Further, spatialized audio data can be rendered to take into account the virtual distance of virtual sound sources from the user/listener's head.

Because the some of the audio processing has already taken place in the first stage audio processing in step 504, the second stage audio processing in step 508 is computationally less intensive than the first stage audio processing. Computational complexity is especially reduced with a reduction in the number of audio sources between the first plurality 602 (original received audio data) and the second plurality 604 (intermediate nodes) of audio sources. Reduced computational complexity reduces sensory latency and system lag.

In some embodiments, when there is minimal pose change, the second stage audio processing in step 508 only minimally changes the second plurality of audio sources 604. In other embodiments, when there is minimal pose change, the second stage audio processing in step 508 may only change the number of the second plurality of audio sources 604.

At step 510, the spatialized audio system 802 (e.g., the speakers 806-1, 806-2, 806-3, 806-4) presents spatialized sound based on the third audio data. The configurations of the speakers 806, such as those shown in FIGS. 2 to 8, 13 and 14 facilitate presentation of sound (e.g., spatialized audio) that is variable along three axes (e.g., X, Y, and Z axes).

Figure 17:
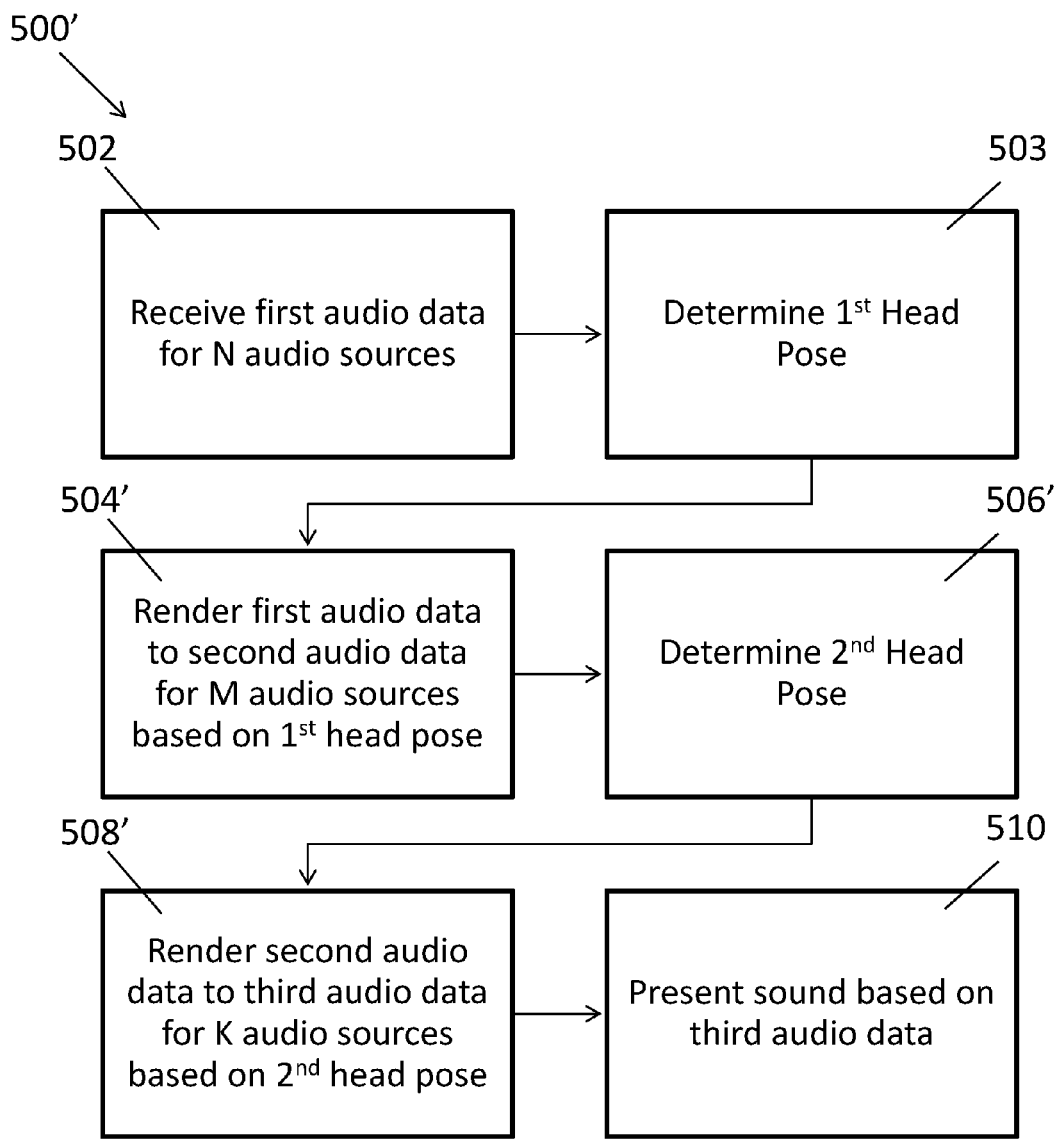

FIG. 17 depicts a method 500' of pose-sensitive audio processing that minimizes sensory latency artifacts according to another embodiment. Steps 502 and 510 in the method 500' depicted in FIG. 17 are identical to the corresponding steps in the method 500 depicted in FIG. 15. Steps 504', 506', and 508' are similar to the corresponding steps in the method 500 depicted in FIG. 15. As in the method 500 depicted in FIG. 15, at step 502, the spatialized audio system 802 (e.g., the audio processor 236 thereof) receives first audio data for (i.e., corresponding to) a first plurality (e.g., N) of audio sources.

The method 500' depicted in FIG. 17 includes step 503 between steps 502 and 504'. In step 503, the spatialized audio system 802 (e.g., the head pose processor 234 thereof) determines a first pose estimate (e.g., head pose) of the user/listener currently wearing the spatialized audio system 802. As part of determining a first pose estimate, the spatialized audio system 802 may collect pose data (e.g., head pose data through the head pose sensor 232) available to the system 802 at step 503. The head pose sensor 232 may include one or more of image capture devices (such as visible and infrared light cameras), inertial measurement units (including accelerometers and gyroscopes), compasses, microphones, GPS units, and radio devices. The head pose sensor 232 may collect head pose data in the form of one or more of images, acceleration and gyroscopic information, compass information, sounds, GPS information, and radio transmissions. All of this data may be used to determine a first head pose of a user/listener. The calculations performed by the head pose processor 234 vary depending on the type(s) of pose data collected (e.g., through the head pose sensor 232).

At step 504', the spatialized audio system 802 (e.g., the audio processor 236 thereof) renders/processes/transforms the first audio data to a second audio data for (i.e., corresponding to) a second plurality (e.g., M) of audio sources, similar to step 504 in the method 500 depicted in FIG. 15. The difference is that in the method 500' depicted in FIG. 17, the first stage of the two-stage audio processing in step 504' explicitly takes into account a first pose (e.g., head pose) estimate of the user/listener currently wearing the spatialized audio system 802 from step 503. Taking into account the pose estimate available at step 503 improves the accuracy of the first stage audio processing/rendering.

At step 506', the spatialized audio system 802 (e.g., the head pose processor 234 thereof) determines a second pose estimate (e.g., head pose) of the user/listener currently wearing the spatialized audio system 802. The second pose estimate is the most current pose estimate at step 506'. As part of determining a most current pose estimate, the spatialized audio system 802 may collect the most recently available pose data (e.g., head pose data through the head pose sensor 232). Step 506' is very similar to step 506 in the method 500 depicted in FIG. 15.

At step 508', the spatialized audio system 802 (e.g., the audio processor 236 thereof) renders/processes/transforms the second audio data to a third audio data for (i.e., corresponding to) a third plurality (e.g., K) of audio sources. The second stage audio processing in step 508' takes into account the second pose (e.g., head pose) estimate of the user/listener currently wearing the spatialized audio system 802 determined in step 506'. Taking into account the second pose estimate available at step 506' improves the accuracy of the second stage audio processing/rendering. The second pose estimate in the method 500' depicted in FIG. 17 is similar to the most current head pose estimate in the method 500 depicted in FIG. 15.

At step 510, the spatialized audio system 802 (e.g., the speakers 806-1, 806-2, 806-3, 806-4) presents spatialized sound based on the third audio data. Step 510 is identical to the corresponding step in the method 500 depicted in FIG. 15.

The two-stage audio processing depicted in FIGS. 15 to 17 and described above may introduce some minor artifacts. An exemplary minor artifact is a slight misalignment of the apparent location of an audio source due to the slight misalignment between an audio source 602 from the first plurality and an audio source 604 from the second plurality. Conceptually passing the sound through the intermediate node 604 from the second plurality may result in a slight misalignment. Further, a virtual sound from a sound source virtually located inside of the "web" of intermediate nodes 604 may have a slightly delayed arrival time due to the shorter original distance compared to the distance to travel to the intermediate node then back to the user/listener. However, these minor artifacts have a much smaller effect on the spatialized audio experience that the major artifacts from sensory latency described above.

The above-described late-frame time warp, pose-sensitive audio processing results in more perceptually-accurate rendering of virtual spatialized audio, despite pose changes of the user/listener. Rendering of virtual spatialized audio can be computationally expensive due to requirements to model audio reflections off of various surfaces, phase and angle variation due to distance, and interference. Two-stage audio processing, with a first stage merging audio sources into fewer intermediate nodes/sources and a second stage final rendering of audio data from the intermediate nodes/sources to account for the latest acquired pose information results in more accurate rendering. The process reduces system latency after acquisition of pose information.

While the late-frame time warp, pose-sensitive audio processing methods 500, 600 describe above include specific numbers of audio sources with specific locations, these numbers and locations are exemplary and not intended to be limiting. Further, the number of processing stages is also exemplary and not intended to be limiting.

Various exemplary embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A spatialized audio system, comprising:
a sensor to detect a most current head pose of a listener; and
a processor to render audio data in first and second stages
the first stage comprising rendering first audio data corresponding to a first plurality of sources, each of the first plurality of sources having one of a first plurality of positions, to second audio data corresponding to a second plurality of sources, each of the second plurality of sources having one of a second plurality of positions, and
the second stage comprising rendering the second audio data corresponding to the second plurality of sources to third audio data corresponding to a third plurality of sources, each of the third plurality of sources having one of a third plurality of positions, based on the detected most current head pose of the listener,
wherein the second plurality of sources consists of fewer sources than the first plurality of sources,
wherein rendering the first audio data to the second audio data comprises warping the first audio data, and
wherein rendering the second audio data to the third audio data comprises warping the second audio data.

2. The system of claim 1, wherein the sensor is an inertial measurement unit.

3. The system of claim 1, wherein the first plurality of sources are virtual sound sources.

4. The system of claim 1, wherein the second plurality of sources are virtual sound sources.

5. The system of claim 1, wherein the sensor detects the most current head pose of the listener after the first stage and before the second stage.

6. The system of claim 5, wherein the sensor detects the most current head pose of the listener immediately before the second stage.

7. The system of claim 1, wherein the third plurality of sources consists of an equal number of sources as or fewer sources than the second plurality of sources.

8. The system of claim 1, wherein the first audio data is a full audio stream data set.

9. The system of claim 1, wherein the second plurality of sources consists of 8 or fewer sources.

10. The system of claim 1, wherein each of the first plurality of sources corresponds to a different position/orientation.

11. The system of claim 1, wherein each of the second plurality of sources corresponds to a different position/orientation.

12. The system of claim 1, wherein each of the third plurality of sources corresponds to a different position/orientation.

13. The system of claim 1,
wherein each of the second plurality of positions is closer to the listener than each of the first plurality of positions.

14. The system of claim 1,
wherein the second plurality of positions are not located in a single plane.

15. The system of claim 1, further comprising a plurality of speakers corresponding to the third plurality of sources to produce sound based on the third audio data.

16. The system of claim 15,
wherein each of the plurality of speakers corresponds to a respective source of the third plurality of sources at a respective one of the third plurality of positions.

17. The system of claim 1, wherein the second stage comprises rendering the second audio data corresponding to the second plurality of sources to the third audio data corresponding to the third plurality of sources based on the detected most current head pose of the listener and respective positions/orientations of the second plurality of sources.

18. The system of claim 1, wherein the second stage is more sensitive to rotation than translation of the listener.

19. The system of claim 1, wherein the second stage is a rotation-only audio transformation.

20. A spatialized audio system, comprising:
a sensor to detect a first head pose at a first time and a second head pose of a listener at a second time, the second time being after the first time; and
a processor to render audio data in first and second stages
the first stage comprising rendering first audio data corresponding to a first plurality of sources, each of the first plurality of sources having one of a first plurality of positions, to second audio data corresponding to a second plurality of sources, each of the second plurality of sources having one of a second plurality of positions, based on the detected first head pose of the listener, and
the second stage comprising rendering the second audio data corresponding to the second plurality of sources to third audio data corresponding to a third plurality of sources, each of the third plurality of sources having one of a third plurality of positions, based on the detected second head pose of the listener,
wherein the second plurality of sources consists of fewer sources than the first plurality of sources,
wherein rendering the first audio data to the second audio data comprises warping the first audio data, and
wherein rendering the second audio data to the third audio data comprises warping the second audio data.

* * * * *